(12) United States Patent
MeLampy et al.

(10) Patent No.: US 8,761,160 B2
(45) Date of Patent: Jun. 24, 2014

(54) SERVICE PATH ROUTING BETWEEN SESSION BORDER CONTROLLERS

(75) Inventors: Patrick J. MeLampy, Dunstable, MA (US); Robert F. Penfield, Concord, MA (US); David Gray, Milford, MA (US); Mariana Benitez Pelaez, Cambridge, MA (US); Ryan Koss, Merrimack, NH (US); Peter Commerford, Belmont, MA (US); Patrick Timmons, Andover, MA (US)

(73) Assignee: Acme Packet, Inc., Bedford, MA (US)

( * ) Notice: Subject to any disclaimer, the term of this patent is extended or adjusted under 35 U.S.C. 154(b) by 111 days.

(21) Appl. No.: 13/028,355

(22) Filed: Feb. 16, 2011

(65) Prior Publication Data

US 2011/0317689 A1    Dec. 29, 2011

Related U.S. Application Data

(60) Provisional application No. 61/358,810, filed on Jun. 25, 2010.

(51) Int. Cl.
*H04L 12/66* (2006.01)
*H04L 12/46* (2006.01)
*H04L 29/06* (2006.01)

(52) U.S. Cl.
CPC ........ *H04L 65/1069* (2013.01); *H04L 65/1053* (2013.01); *H04L 65/1006* (2013.01)
USPC .......................................... 370/356; 370/401

(58) Field of Classification Search
CPC .................................................. H04L 65/1073
USPC .................................................. 370/352–356
See application file for complete search history.

(56) References Cited

U.S. PATENT DOCUMENTS

| 7,197,040 B2 * | 3/2007 | Bressoud et al. | 370/401 |
| 2003/0055985 A1 * | 3/2003 | Corb et al. | 709/227 |
| 2006/0092857 A1 * | 5/2006 | Ansari et al. | 370/254 |
| 2006/0187900 A1 | 8/2006 | Akbar | |
| 2007/0094412 A1 * | 4/2007 | Sollee | 709/245 |
| 2007/0192508 A1 * | 8/2007 | Sollee | 709/245 |
| 2009/0059895 A1 * | 3/2009 | Yasrebi et al. | 370/352 |
| 2009/0147770 A1 * | 6/2009 | Ku | 370/351 |
| 2009/0164664 A1 * | 6/2009 | Buch et al. | 709/244 |
| 2009/0172776 A1 * | 7/2009 | Makagon et al. | 726/2 |

(Continued)

OTHER PUBLICATIONS

Hattingh et al., "SIP Trunking, Migrating from TDM to IP for Business to Business Communication", Cisco Press, Chap. 5 "Components of SIP Trunks" and p. 22, published on Feb. 2010.*
Uzelac et al., "Speermint Peering Architecture", draft-ietf-speermint-architecture-10, available at http://tools.ietf.org/html/draft-ietf-speermint-architecture-10, Mar. 9, 2010.*

(Continued)

*Primary Examiner* — Asad Nawaz
*Assistant Examiner* — Zhaohui Yang
(74) *Attorney, Agent, or Firm* — Miles & Stockbridge P.C.

(57) ABSTRACT

Systems and methods of establishing IP telephony sessions between enterprises are disclosed. A first enterprise requests an association with a second enterprise. Both enterprises and the second enterprise belong to the same federation. The association request is accepted, to establish an association between the first and second enterprises. In response to the acceptance, a direct routed path is established between the first enterprise and the second enterprise. One of the associated enterprises requests activation of an IP telephony service. If the request to activate references the association, an IP telephony session is established using the direct routed path.

13 Claims, 18 Drawing Sheets

(56) References Cited

U.S. PATENT DOCUMENTS

| | | |
|---|---|---|
| 2009/0213837 A1* | 8/2009 | Ku et al. .................... 370/352 |
| 2009/0213844 A1 | 8/2009 | Hughston |
| 2009/0245492 A1* | 10/2009 | Baker et al. ............. 379/112.01 |
| 2010/0046507 A1 | 2/2010 | Rosenberg |
| 2010/0061228 A1 | 3/2010 | Grabelsky |
| 2010/0082557 A1* | 4/2010 | Gao et al. .................... 707/694 |
| 2010/0232593 A1* | 9/2010 | Ku ........................... 379/220.01 |
| 2011/0317688 A1* | 12/2011 | MeLampy et al. ............ 370/352 |

OTHER PUBLICATIONS

Roach, "RFC 3265, Session Initiation Protocol (SIP)—Specific Event Notification", published on Jun. 2002.*

Petrie et al., "A Framework for Session Initiation Protocol User Agent Profile Delivery, draft-ietf-sipping-config-framework-17", published on Feb. 16, 2010.*

International Search Report and Written Opinion, mailed Oct. 24, 2011.

* cited by examiner

SERVICE PATH ROUTING BETWEEN SESSION BORDER CONTROLLERS

CROSS REFERENCE TO RELATED APPLICATIONS

This application claims the benefit of U.S. Provisional Application No. 61/358,810, filed Jun. 25, 2010, which is incorporated by reference herein.

TECHNICAL FIELD

The present disclosure relates to Internet voice and data services.

BACKGROUND

Many enterprises have moved from telephony services using the Public Switched Telephone Network (PSTN), provided by a traditional telephone company, to telephony services using the Internet Protocol (IP), provided by an IP Telephony service provider. Such services are commonly known as Voice over IP (VoIP) or IP Telephony. Now that an IP network, such as the public Internet or a private IP network, can be used as a backbone rather than the limited PSTN, IP Telephony has the capability of providing advanced features such as video conferencing, call recording, and call forwarding, to name a few. However, the primary use of IP Telephony service is still to connect IP Telephony callers to PSTN callers. For this reason, the signaling infrastructure (i.e. SIP proxies, application servers, etc.) utilized by the IP telephony service provider is designed to allow many different types of endpoints to access the less feature-rich services provided by PSTN gateways. The service provider often manipulates and/or normalizes traffic (e.g., translation to a least common denominator codec, manipulating/removing certain SIP headers, etc.). Such manipulations can prevent the advanced IP telephony services which act to differentiate IP telephony from PSTN telephony.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
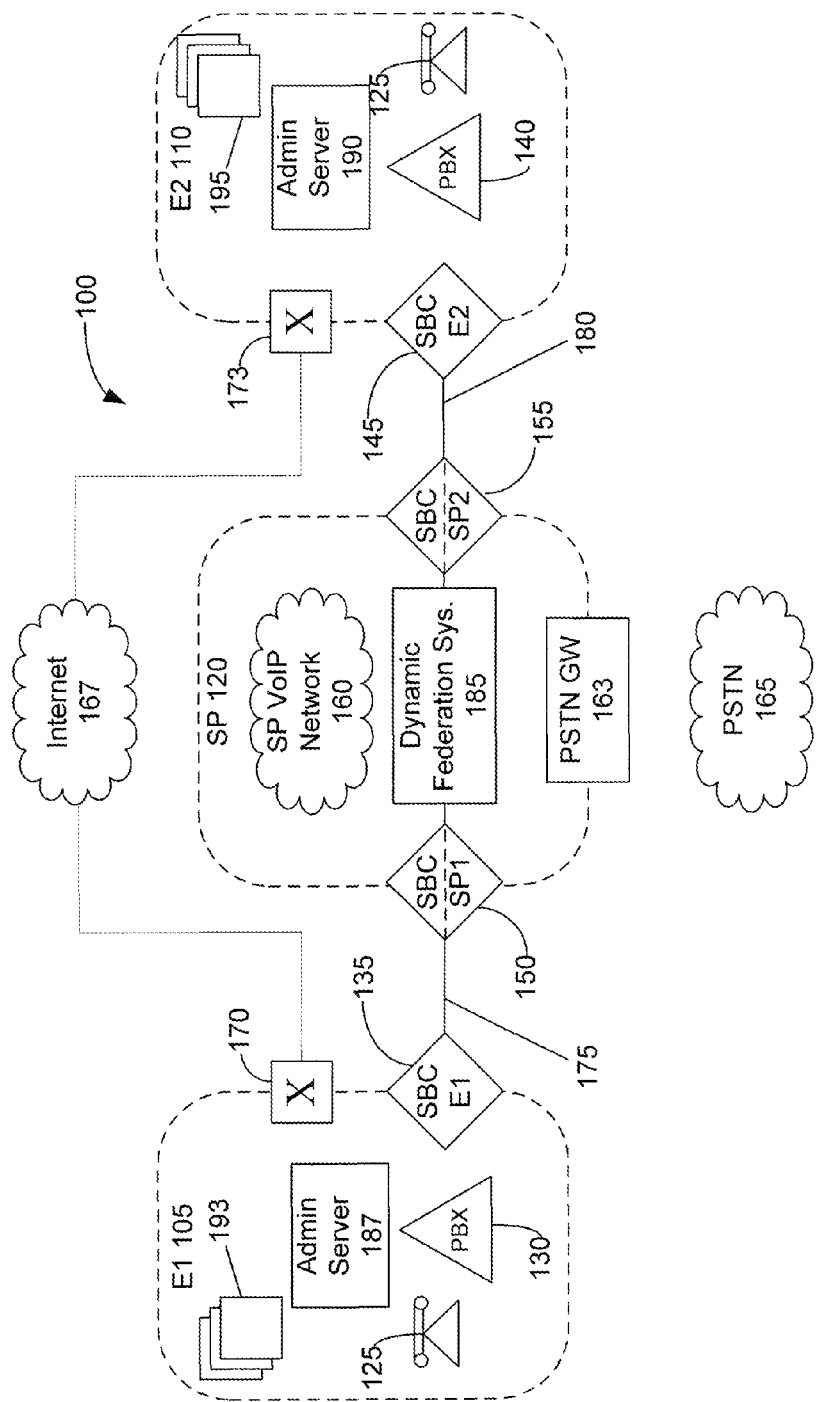
FIG. 1 is a block diagram of a federated system according to with some embodiments disclosed herein.

FIG. 1 is a high-level block diagram of a federated system 100 which includes two enterprises (E1 105, E2 110) that both obtain Internet telephony services from the same service provider (SP 120). Such services may include basic services such as voice and video as well as advanced services such as voice conferencing, video conferencing, private dialing, and caller identification. The communications infrastructure of the federated system 100 includes a pair of session border controllers (SBCs) for each enterprise, one residing at the service provider, and the other residing at the respective enterprise. The communications infrastructure of each enterprise includes a PBX in communication with its respective SBC, as well as phones, computers, or other communication devices 125. Thus, in the example federation of FIG. 1, enterprise E1 105 includes a PBX (PBX-E1 130) in communication with an SBC (SBC-E1 135), enterprise E2 110 includes a PBX (PBX-E2 140) in communication with an SBC (SBC-E2 145), SBC-E1 135 connects to a service provider SBC (SBC-SP1 150), and SBC-E2 145 connects to another service provider SBC (SBC-SP2 155).

The service provider 120 includes additional communications infrastructure which makes up a VoIP network 160. The VoIP network 160 may include a PSTN gateway 163 which allows customers of the service provider 120 (such as enterprises E1 105 and E2 110) to make calls to/from the PTSN 165. In addition to Internet telephony, enterprises E1 105 and E2 110 also have data connections to the Internet 167, for example through a router 170, 173. In the example of FIG. 1, the Internet 167 is shown separate from the VoIP network 160, but it should be appreciated that the same service provider 120 may provide both Internet data and Internet telephony services.

Each enterprise E1 105, E2 110 utilizes a communication channel known as a SIP trunk 175, 180. As used herein, a SIP trunk is a service offered by service provider 120 which directly connects a service provider's IP network to the SBC/PBX deployed at the enterprise. More specifically a SIP trunk is defined as the combination of an IP address and port for the enterprise, the IP address and port of the service provider SBC 150, 155, and the service level agreement constraints (e.g., concurrent number of sessions and/or bandwidth). In some embodiments, the IP address and port for the enterprise is the address and port of the enterprise SBC (E1 105, E2 110). In other embodiments, the IP address and port for the enterprise is the address and port of the enterprise PBX (130, 140). The type of traffic exchanged over SIP trunk 175, 180 may include VoIP, IP video, multimedia/collaborative sessions, and/or other services making use of IP signaling protocols.

The federated system 100 also includes a dynamic federation system 185. The dynamic federation system 185 is a distributed system whose components will be explained in further detail below. For purposes of this initial overview, dynamic federation system 185 can be considered to be a single component. Dynamic federation system 185 is in communication with each of the service provider SBCs (SBC-SP1 150, SBC-SP2 155) over its respective SIP trunk 175, 180. Dynamic federation system 185 is also connected to Internet 167. As will be explained in more detail below, dynamic federation system 185 creates associations between enterprises by coordinating actions among the service provider SBCs (SBC-SP1 150, SBC-SP2 155) and the enterprise SBCs (SBC-E1 135, SBC-E2 145). Once an enterprise association is created, dynamic federation system 185 provides a direct routed path between the associated enterprises, and enables the associated enterprises to use IP telephony services which take advantage of this direct routed path.

Each of enterprises E1 105 and E2 110 also includes an administrative server 187, 190 in communication with dynamic federation system 185 over Internet 167. Administrative server 187, 190 handles various administrative functions such as enterprise requests to join federated system 100 and to associate with other enterprises. An enterprise user invokes these administrative functions through an administrative client 193, 195. In some embodiments, administrative server 187, 190 takes the form of a web server and administrative 193, 195 takes the form of a browser that accesses web pages provided by administrative server 187, 190.

Figure 2:
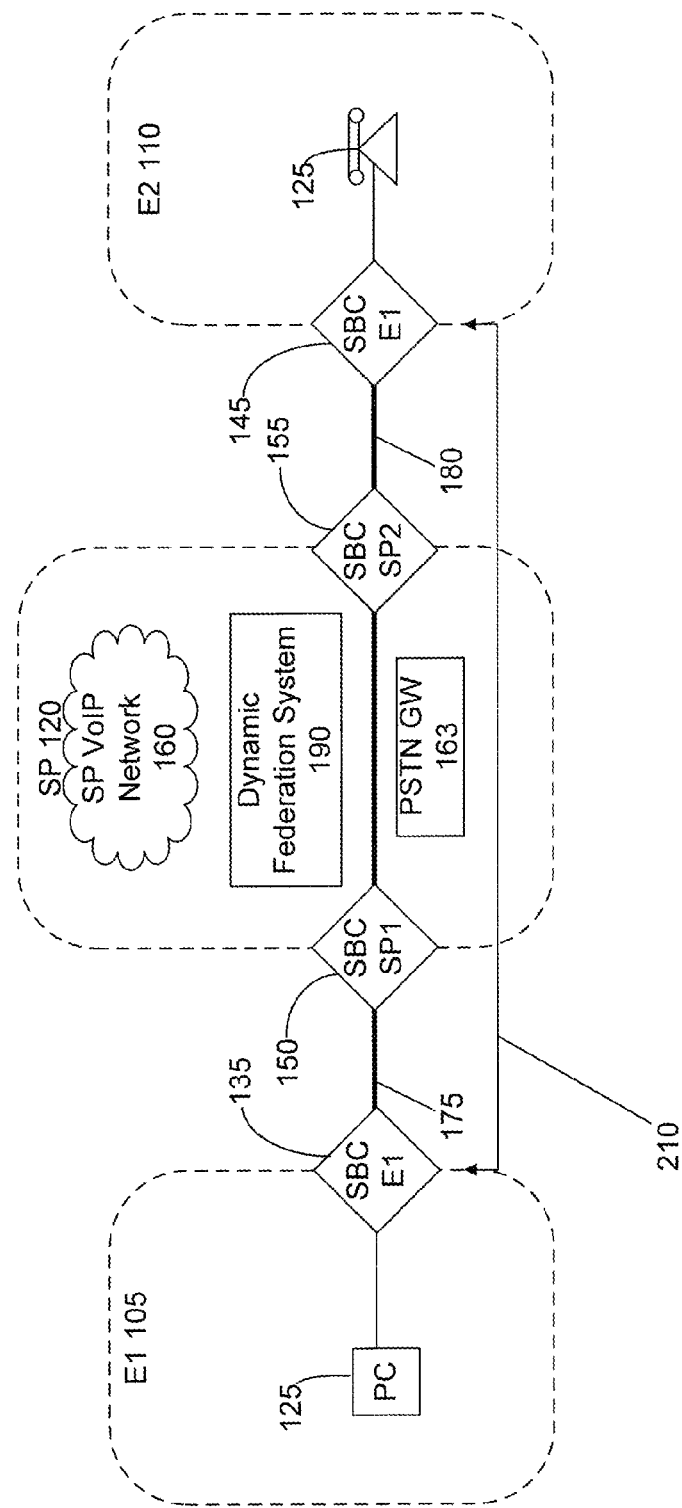
FIG. 2 is a block diagram showing selected components of the federated system of FIG. 1 according to some embodiments disclosed herein.

FIG. 2 is another high-level block diagram showing selected components of federated system 100 from FIG. 1. Using the techniques described herein, dynamic federation system 185 allows an enterprise, such as E1 105, to associate with (to "friend") another enterprise in the federated system 100, such as E2 110. Dynamic federation system 185 then coordinates actions among the service provider SBCs (SBC-SP1 150, SBC-SP2 155) and the enterprise SBCs (SBC-E1 135, SBC-E2 145) to create a direct routed path 210 between the associated enterprises. This direct routed path 210 is linked to directory information (e.g., a set of phone numbers, email-style URI addresses, URLs, etc).

A user in enterprise E1 105 uses a phone, computer, or communication device 125 to activate a telephony service (e.g., place a call, get directory assistance, set up a video conference, etc.). If the service is activated using a phone number linked to direct routed path 210, the originating enterprise SBC sets up the call using direct routed path 210. The call thus traverses the originating enterprise SBC (SBC-SP1 150), the SP SBC in communication with the originating enterprise SBC (SBC-E1 135), the peer SP SBC (SBC-SP2 155), and the terminating enterprise SBC (SBC-E2 145).

Thus, after enterprise E1 105 has successfully associated with enterprise E2 110, those IP telephony sessions made by enterprise E1 105 that match enterprise E2's directory information for the federated service ("federated sessions") are routed directly over direct routed path 210. This direct routed path 210 was established when the association was created, using the techniques described herein. As should be appreciated, such IP telephony sessions include media packets, which may take the form of voice packets, video packets, etc.

In some embodiments, signaling packets associated with the IP telephone session also travel over the same direct routed path 210.

Importantly, direct routed path 210 bypasses other service provider signaling equipment within the VoIP network 160 that may prevent advanced IP communications to function. In particular, direct routed path 210 bypasses the PTSN 165 and uses packet switching rather than time division multiplexed (TDM). Because the service provider's VoIP network 160 is designed to connect many different types of endpoints to the PSTN gateway 163, the service provider often manipulates and/or normalizes traffic (e.g. translation to a least common denominator codec, manipulating/removing certain SIP headers, etc.) so as to conform to the lowest common denominator of basic PSTN service. This manipulation and resulting loss of capabilities can prevent advanced IP telephony services. The dynamic federation system 185 conveys the media packets over the directed routed path, avoiding the PSTN gateway 163 and corresponding manipulations of the packets carrying voice traffic. Some embodiments also convey signaling packets over the same direct routed path. By confining the path to specific SBCs operated by the enterprises, and avoiding signaling equipment within VoIP network 160 operated by the service provider, the direct routed path coordinated by the dynamic federation system 185 allows the enhanced features to be used, with full capabilities.

Figure 3A:
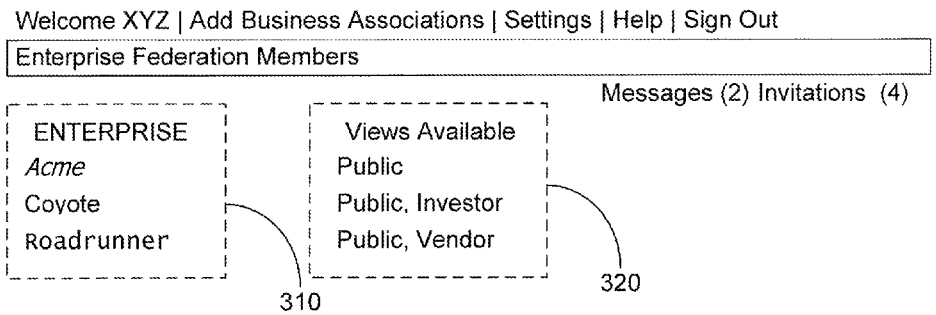
FIGS. 3A-C depict a user interface provided by selected components of the federated system of FIG. 1 according to some embodiments disclosed herein.
Figure 3B:
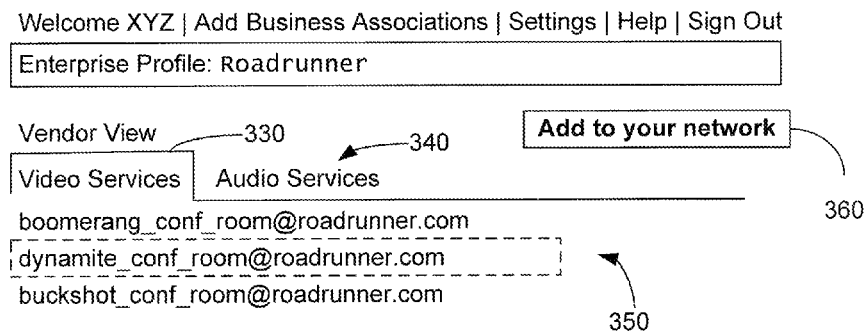
Figure 3C:
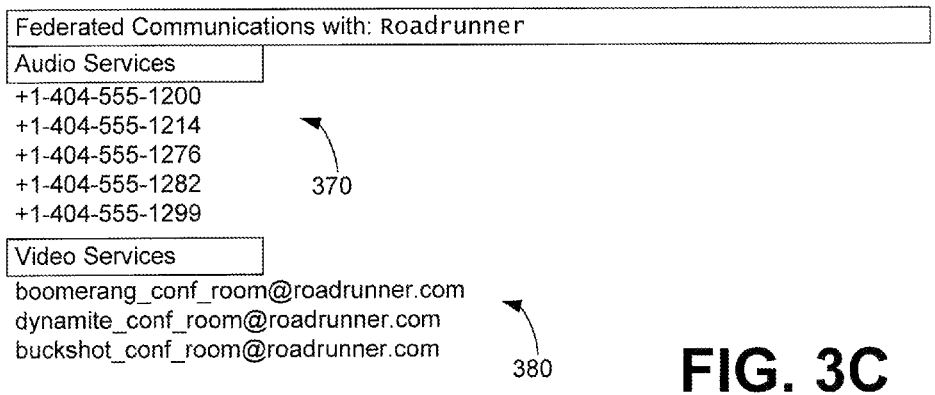

FIGS. 3A-C are examples of a enterprise federation user interface provided by administrative server 193, administrative client 193, or a combination thereof. FIG. 3A illustrates a screen shown to an enterprise user after the user signs in to federated system 100, according to some embodiments. The user in federation XYZ sees a list 310 of federation members with which enterprise XYZ can associate, along with a list 320 of views for each. In addition to a default public view, enterprises can define other views in order to offer different services to different enterprises. Each view has independent visibility rules for privacy. In this particular example, list 310 shows that enterprise XYZ can associate with Acme, Coyote, and Roadrunner. List 320 shows that Coyote offers additional services to Acme through its Investor view and that Roadrunner offers additional services to Acme through its Vendor View.

FIG. 3B illustrates a screen shown to an enterprise user after the user selects an enterprise from the screen in FIG. 3A, according to some embodiments. Having selected a particular enterprise and view—here, the Vendor view for Roadrunner—the user in federation XYZ sees one or more types of services provided by Roadrunner for use by XYZ. In this example, Roadrunner allows its vendors to use Roadrunner's video services 330 and audio services 340. Further, list 350 shows that Acme is allowed to use video conferencing services provided by Roadrunner to video conference with Roadrunner in three different Roadrunner rooms. The user interface of FIG. 3B allows the user to select one of these services and then add (360) the selected service to XYZ's network.

As mentioned above, once the user adds a service from another enterprise, federated system 100 sends an association request to the other enterprise for the selected service, as mentioned above. Once the other enterprise has accepted the association and a direct routed path 210 has been established between the two enterprises for the particular service, users of the "friending" enterprise can use the service. This service is referred to herein as a "federated service". Sessions using a federated service ("federated sessions") travel over the direct routed path 210 as noted above.

FIG. 3C illustrates a directory screen of federated services, according to some embodiments. In the example of FIG. 3C, Roadrunner offers a number of ways by which XYZ can contact Roadrunner: a list 370 of three video conferencing services; and a list 380 of five voice (plain audio) services. An XYZ user can initiate a session with Roadrunner by dialing one of the numbers and/or entering one of addresses shown on this directory screen.

When that happens, the enterprise SBC for XYZ (SBC-E1 135 in FIG. 1) uses the techniques described herein to identify the session as a federated session. Once identified, the enterprise SBC for XYZ sends the packets which make up the session over the SIP trunk (180 in FIG. 1) into the service provider's core network. From there, the service provider SBC associated with XYZ (SBC-E1 135 in FIG. 1) identifies the federated session and directly routes it over direct routed path 210 towards the service provider SBC associated with Roadrunner (SBC-E2 145 in FIG. 1). Because the federated session travels over the direct routed path 210, thus avoiding PTSN 165 as well as most of the service provider's VoIP network 160, federated system 100 supports advanced services such as video, high quality audio, conference bridge, call recording, etc.

Figure 4A:
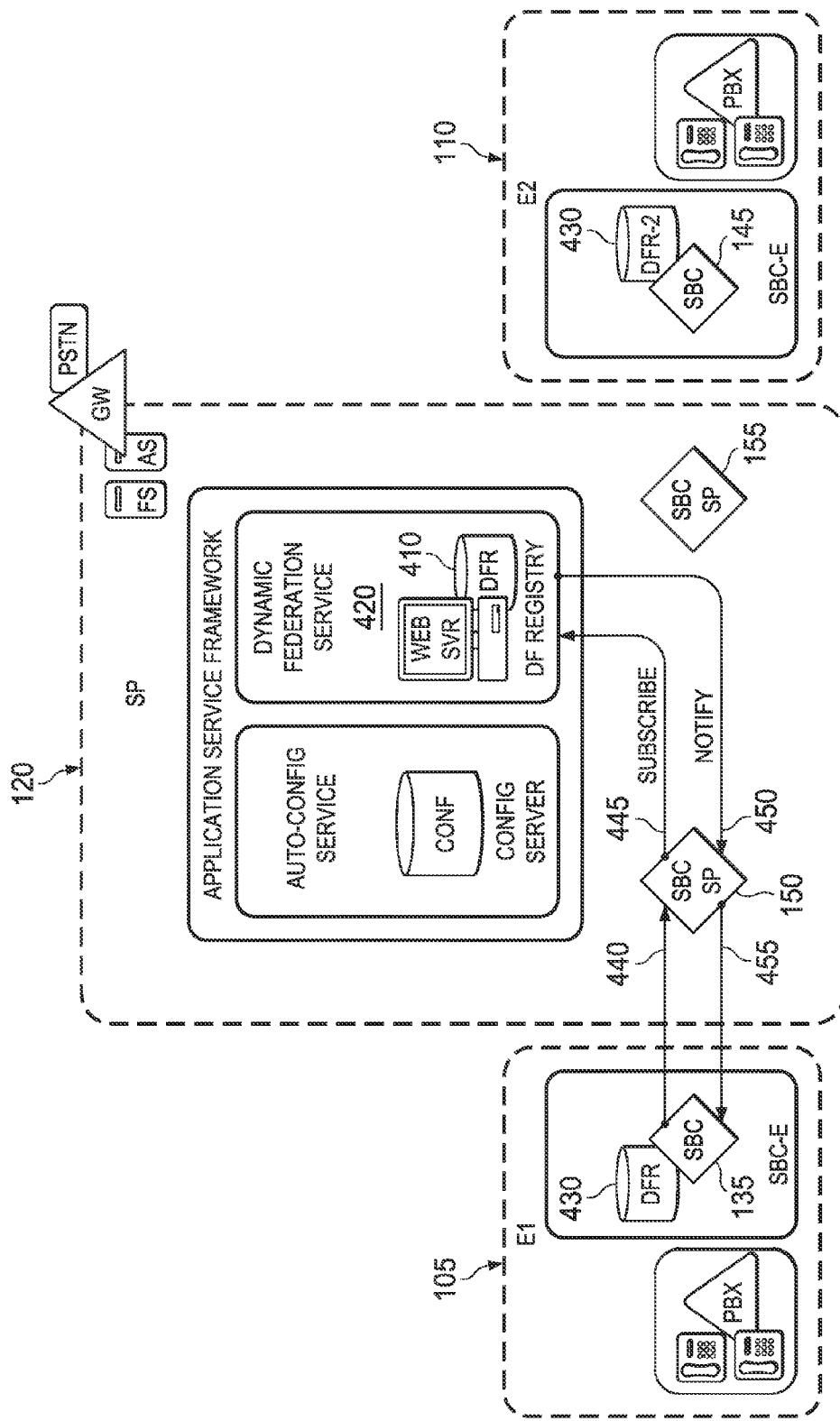
FIGS. 4A-4C form a messaging diagram of direct routed path creation according to some embodiments disclosed herein.
Figure 4B:
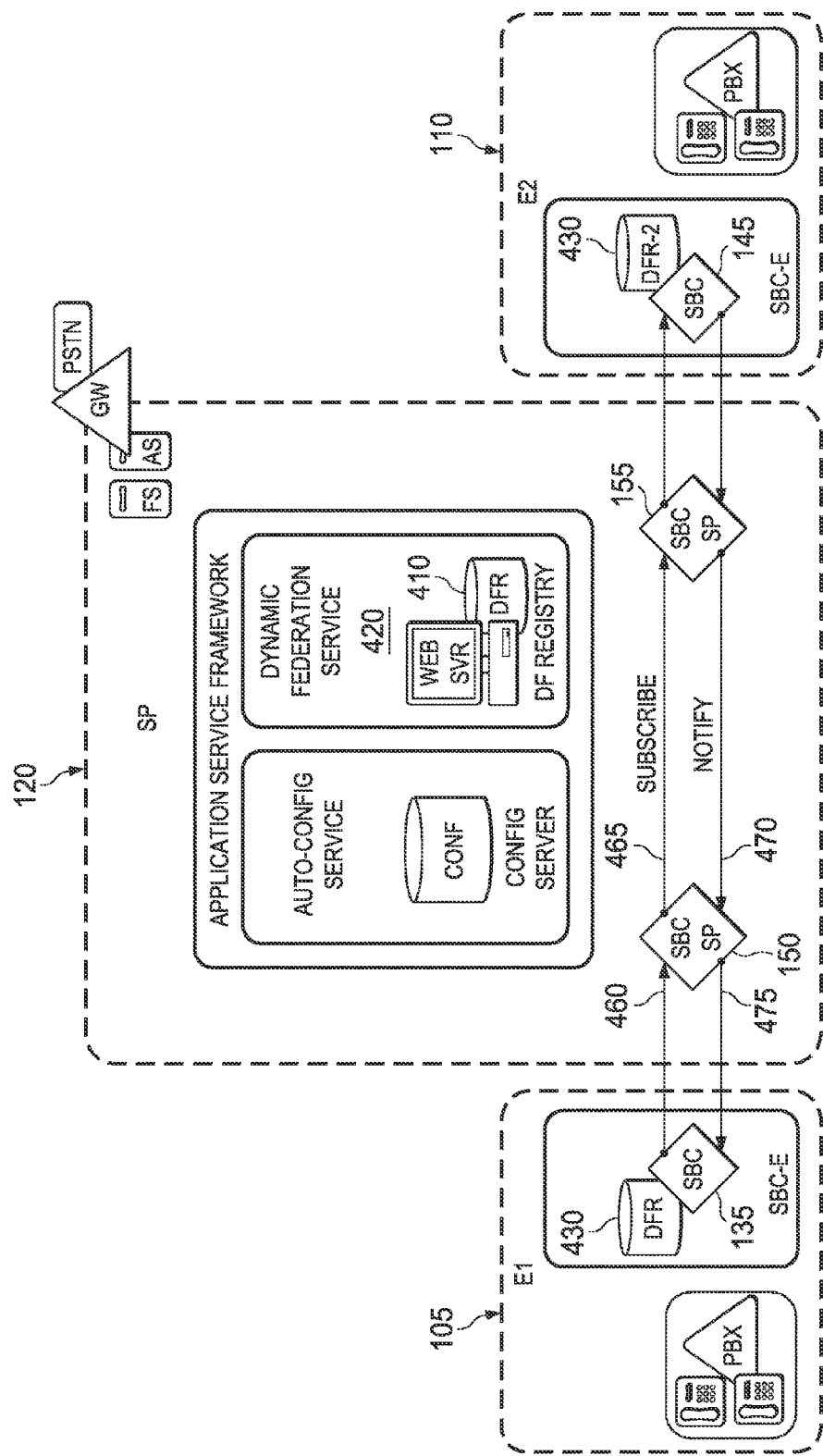
Figure 4C:
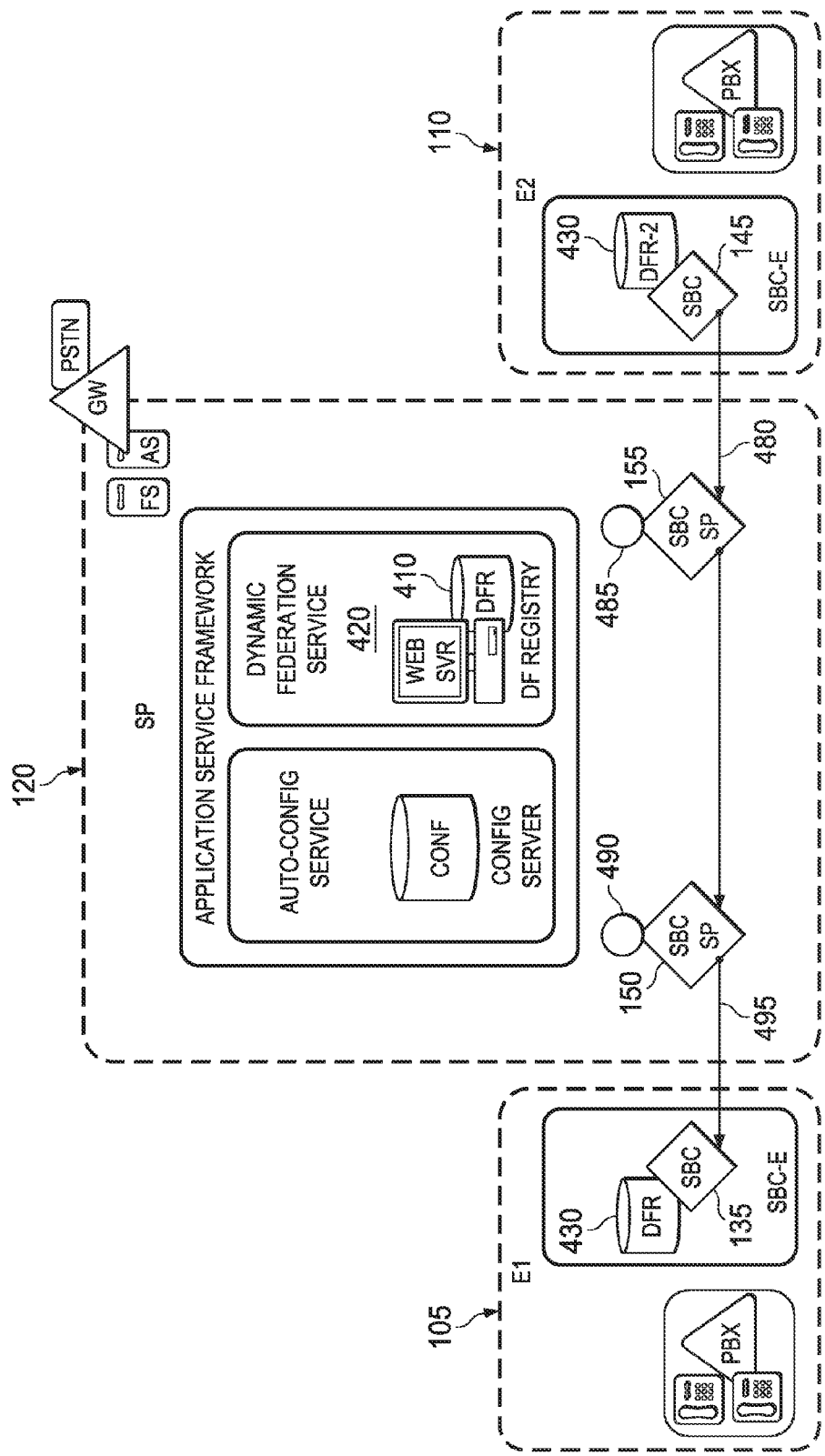

FIGS. 4A-4C form a messaging diagram illustrating, in more detail, the process of creating a direct routed path 210 (FIG. 2) in terms of interactions between various components of federated system 100 from FIG. 1. As noted above, dynamic federation system 185 of FIG. 1 is a distributed system, which will now be discussed in further detail. Dynamic federation system 185 includes a centralized dynamic federation registry (DFR-C) 410, managed by a dynamic federation service (DFS) 420. DFR-C 410 and DFS 420 are located within the service provider's network. Dynamic federation system 185 also includes enterprise registry instances (DFR-E) 430, one for each enterprise, located within the corresponding enterprise network.

The process of creating a direct routed path 210 in the embodiment of FIG. 4 can be viewed as occurring in three parts. First, DFR-C 410 learns the location of each DFR-E instance, as will be explained in connection with FIG. 4A. Next, route paths to reach an associated enterprise are dynamically learned, as will be explained in connection with FIG. 4B. Finally, federated communications are associated with a direct routed path by detecting federated communications at an enterprise SBC and tagging a communication so that it traverses the appropriate service route path, as will be explained in connection with FIG. 4C.

FIG. 4A illustrates how centralized registry DFR-C 410 learns the location of each DFR-E 430 instance. This learning occurs over a SIP trunk (180 or 175 in FIG. 1). The service provider SBC (SBC-SP1 150) acts as a back to back user agent (B2BUA), as defined by SIP, so that SIP Subscribe and Notify messages between the enterprise SBC (SBC-E1 135) and service provider SBC are terminated at the service provider SBC.

As shown in FIG. 4A, each enterprise SBC that is participating in dynamic federation system 185 subscribes to centralized registry DFR-C 410, in order to be notified later of confirmed associations with other enterprises. An enterprise SBC (SBC-E1 135) does this using a SIP Subscribe message. As noted above, the subscribe message (440) from the enterprise SBC is terminated at the corresponding service provider SBC (SBC-SP1 150), which then forwards (445) a corresponding subscribe to DFR-C 410.

As a result of the subscription from the E-SBC, DFR-C 410 notifies the subscriber E-SBC of new associations. To do so, DFR-C 410 creates a watcher event, meaning that DFR-C 410 is now watching for changes to the configuration of enterprise SBCs, where these changes are learned by communications between centralized DFR-C 410 and individual enterprise DFR-Es 430.

As noted above in the discussion of the user interface in FIGS. 3A-3C, association of one enterprise with another involves user interaction which results in a change to the DFR-E of the association-originating enterprise. Since DFR-C 410 created a watcher event, DFR-C 410 is notified of these changes. Thus, the act of enterprise E2 110 associating with enterprise E1 105 causes DFR-C 410 to send a watcher event (450) to the service provider SBC (SBC-SP1 150), intended for the recipient enterprise E1 105. Watcher event 450 includes a list of associating enterprises. For each associating enterprise, a watcher event 450 includes the URI of the association-originating enterprise SBC (SBC-E2 145) and includes the URI of the enterprise SBC's "home" service provider SBC (SBC-SP2 155) for routing purposes. The association-originating (far end) E-SBC will be referred to as the "watcher" for the remainder of the discussion of FIGS. 4A-C.

Receipt of watcher event 450 by the service provider SBC (SBC-SP1 150) triggers the first step in learning the direct routed path (210 in FIG. 2) between the associated enterprise SBCs (SBC-E1 135 and SBC-E2 145). Specifically, the service provider SBC obtains the route traversed by watcher event 450 by parsing SIP headers in the watcher event. The service provider SBC is listed as the SIP contact header, and the SIP record-route header includes intermediaries that will remain in the path as packets travel from the service provider SBC to the centralized DFR-C 410. It is unnecessary for the service provider SBC to use the watcher event to obtain URIs of the association-originating (far end) service provider SBC and enterprise SBC, since the service provider SBC can obtain these URIs from the SIP trunk (180 in FIG. 1).

Having obtained the route traversed by watcher event 450, the service provider SBC (SBC-SP1 150) adds the route to its own route table, using the watcher's enterprise trunk identifier as a key. Although the trunk identifier may be encrypted, it is used as an index into the SP-SBC route table that provides the route set to the newly associated SP-SBC/E-SBC. In other words, the encrypted trunk identifier can still be used as a cookie or handle. In some embodiments which hide network topology, the service provider SBC strips the SP-SBC route URI from the watcher event before delivery since that URI exposes topology that the receiving E-SBC should not be aware of.

The service provider SBC (SBC-SP1 150) then continues processing watcher event 450 by informing its enterprise SBC (SBC-E1 135) of the newly associated enterprise E2 110 through a Notify message (455). (As discussed above, enterprise E1 105 subscribed to new associations at step message (440.) Notify message 455 includes a list of one or more newly associated enterprises (here, this list includes enterprise E2 110). Specifically, Notify message 455 includes the URI of the association-originating E-DFR, the far-end SP-SBC through which to route SIP traffic to the newly associated enterprise, and the SIP trunk identifier of the newly associated enterprise.

FIG. 4B shows how the direct routed path (210 in FIG. 2) to the newly associated enterprise is dynamically learned, based on an enterprise-specific subscription for block-data. When an enterprise that has advertised services confirms an incoming association (either by specific user action or by auto-confirm), the enterprise SBC subscribes to the newly-associated DFR-E. This process will now be further described The enterprise SBC (SBC-E1 135) submits a SIP subscription request 460 to its home SP-SBC (SBC-SP1 150) using the RequestURI and trunk identifier to identify the newly associated destination E-SBC (SBC-E2 145). The enterprise SBC (SBC-E1 135) learned the RequestURI and the trunk identifier from previously received Notify 455 (FIG. 4A). As noted earlier, the trunk identifier may be encrypted. On receipt of the subscription request, the home SP-SBC (SBC-SP1 150) uses the trunk identifier (after decrypting if necessary) to perform a route table look-up. The route retrieved from the route table identifies the destination (far) SP-SBC (SBC-SP2 155). The home SP-SBC (SBC-SP1 150) sends a new subscription request 465, a Presence subscription, to the SBC address retrieved from the look-up.

The presence subscription request 465 travels to the destination SP-SBC (SBC-SP2 155). Per the SIP protocol, the destination SP-SBC (SBC-SP2 155) returns a success response 470 (e.g., "200 OK") back to the home SP-SBC (SBC-SP1 150). Since the home SP-SBC acts as a SIP back to back user agent (B2BUA), the route path is conveyed the home SP-SBC (SBC-SP1 150) in the record-route header of the success response 470. As a B2BUA, the home SP-SBC is listed in the contact header and the record route contains intermediaries if applicable. Thus, the route set described by the contact header and the record-route header forms the direct routed path (210 in FIG. 2) between the (far) association-originating EBC (SBC-E2 145) and the (near) association-accepting EBC (SBC-E1 135).

Each SP-SBC (SBC-SP1 150, SBC-SP2 155) stores the route set learned from this exchange in its respective SIP routing table using the trunk identifier of the opposite enterprise SBC (SBC-E1 135 or SBC-E2 145) as a table index. Having both SP-SBCs (SBC-SP1 150, SBC-SP2 155) store the route set allows for handling of two opposing presence subscribe, which may occur if a particular enterprise prefers to be only a consumer of the service, or only a provider of the service. Finally, each DFR-E will receive a NOTIFY 475 with a data-block of the URIs for the given association, and updates the local registry accordingly.

FIG. 4C shows how communications are associated with a direct routed path (210 in FIG. 2). An enterprise SBC detects a federated communication and tags the communication appropriately so that signaling and media packets in the federated communication follow the direct routed path. At step 480, a VoIP communication is initiated by an enterprise user, e.g., a user dials boomerang-conf@coyote.com. The home enterprise SBC (SBC-E2 145) receives this communication as a SIP message from the PBX or the user's SIP phone. The home enterprise SBC (SBC-E2 145) compares the destination URI to a list of federated services, and on finding a match, tags the communication with a cookie or handle. The cookie used to tag the communication as a federated communication is a cookie that was previously provided by the home service provider SBC (SBC-SP2 155). The home enterprise SBC also applies a normalization profile if one exists for the direct routed path (identified by the cookie). The home enterprise SBC (SBC-E1 135) routes the tagged VoIP communication to its home service provider SBC (SBC-SP2 155) over the SIP trunk.

At step 485, the home service provider SBC (SBC-SP2 155) receives the tagged VoIP communication and looking for the tag (cookie) that was inserted into the SIP Offer by the home enterprise SBC (SBC-E2 145). Presence of this tag indicates a federated communications. The home service provider SBC (SBC-SP2 155) does not apply normalization profiles to tagged communications, as it does to untagged communications. Thus, federated communications bypass the SP-SBC's typical normalization of codecs, etc.

The home service provider SBC (SBC-SP2 155) examines the SIP header of the federated communication and embeds a SIP Route header using information in the cookie which identifies the far end (target) service provider SBC and far end (target) enterprise SBC. An example Route header is: "<SBC-E1>; route=<SP-SBC-1>, <proxies>", where the strings within the brackets are filled in from the cookie. In some embodiments, any address information for the home enterprise SBC is hidden by the home service provider SBC (SBC-SP2 155) as part of the Network Address Translation topology hiding function that is performed by a conventional SBC.

At step 490, the far end service provider SBC (SBC-SP1 150) receives the SIP message containing the federated communication. The far end service provider SBC (SBC-SP1 150) recognizes the SIP message as a federated communication based on the cookie. The far end service provider SBC (SBC-SP1 150) uses the cookie to looks up the associated trunk identifier in its routing table. The far end service provider SBC (SBC-SP1 150) then routes the federated communication to the appropriate far end enterprise SBC (SBC-E2 145) with a specific tag from the routing table. Notably, the far end service provider SBC (SBC-SP1 150) does not apply any signaling normalizations.

At step 495, the far end enterprise SBC (SBC-E2 145) receives the federated communication. The far end enterprise SBC (SBC-E2 145) identifies the communication as a federated communication by the presence of the cookie. The far end enterprise SBC (SBC-E2 145) removes the cookie and applies a normalization profile specific to the direct routed path if applicable. Finally, the far end enterprise SBC (SBC-E2 145) delivers the session conveyed by the federated communication to the PBX or the SIP phone.

Figure 5:
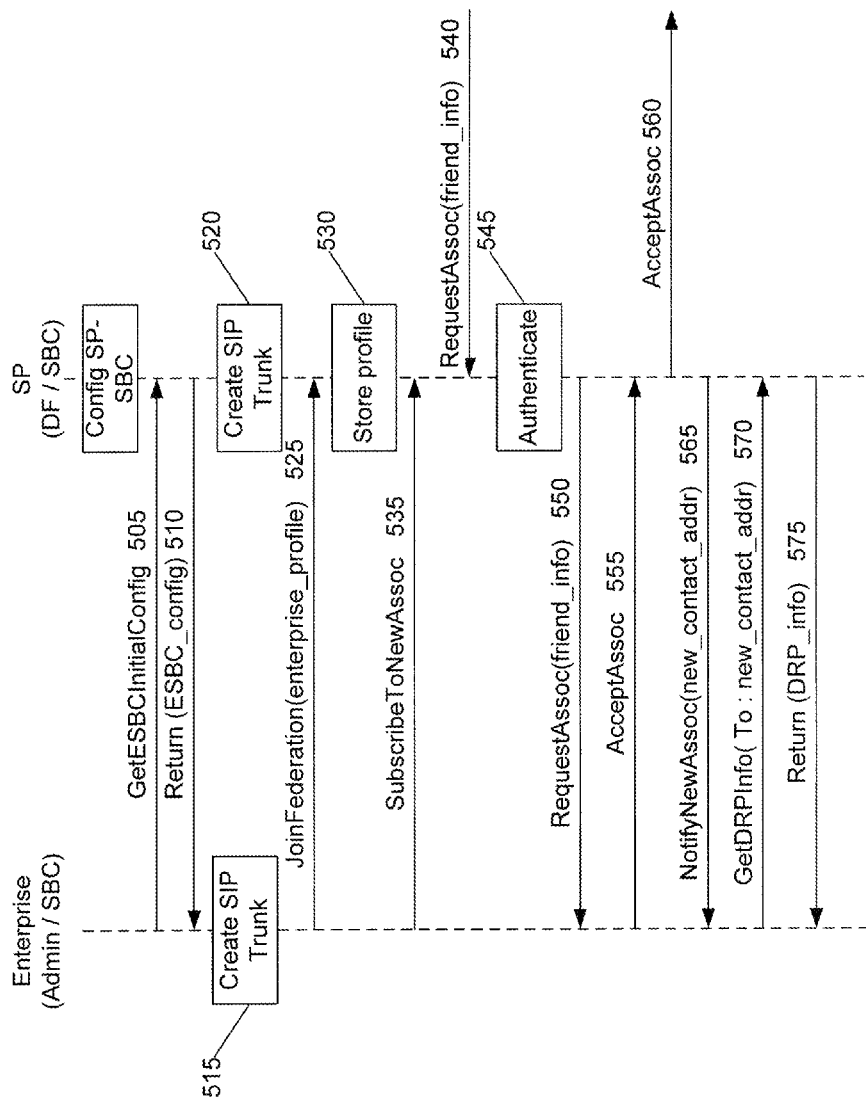
FIG. 5 is a diagram illustrating the process of creating a direct routed path according to some embodiments disclosed herein.

FIG. 5 is a diagram illustrating, in more detail, the process of creating a direct routed path 210 (FIG. 2) in terms of interactions between various components of federated system 100 from FIG. 1. The focus in FIG. 5 is information retrieved by the enterprise and service provider SBCs within the VZW network. This subsection will explain how this works at a high level.

FIG. 5 can be viewed as a series of logical messages between an enterprise and the service provider, where the enterprise includes the administrative client 193 and the SBC-E1 135 and the service provider includes the dynamic federation system 185 and SBC-SP1 150. Each message causes functions to be executed on one or more of these components. However, since this is a high-level overview, the diagram of FIG. 5 does not describe which components at each location perform the functions. Information about how specific components interact in creating direct routed path 210 will be described below. Furthermore, FIG. 5 illustrates messages as traveling over a logical channel, with no specifics as to the particular type of channel used (e.g., TCP connection, SIP messages, HTTP transactions, Web services through SOAP or REST, etc.) In some embodiments, the messages of FIG. 5 could be conveyed using more than one type of channel, for example, a particular message might involve a Web service between the administrative client 193 and the dynamic federation system 185 in conjunction with SIP messages over a SIP trunk between the dynamic federation system 185 and the SBC-SP1 150. These messages, and the channels used by the messages, will be discussed in more detail below.

As shown in FIG. 5, the process of creating a direct routed path 210 begins with the enterprise E1 105 requesting (505) from service provider 120 an initial configuration for the SBC-E1 135. In response, service provider 120 returns (510) an initial configuration. The enterprise E1 105 applies this configuration to SBC-E1 135 and creates (515) the enterprise end of a SIP trunk between SBC-E1 135 and SBC-SP1 150. Service provider 120 creates (520) the service-provider end of the same SIP trunk. As explained earlier, the SIP trunk (175 and 180 in FIG. 1) is used for some communications between SBC-E1 135 and the SBC-SP1 150. Thus, as illustrated here, SIP trunk can be understood as a logical construct managed by both ends (the service provider SBC and the enterprise SBC).

At some later point, which may occur in response to a request from an enterprise user, the enterprise E1 105 joins (525) the federated system 100, providing an enterprise profile. Service provider 120 stores (530) the enterprise profile in order to make it available to other members of the federated system 100. The enterprise profile includes directory information for the enterprise (e.g., domains, phone numbers, URLs, etc.), trunk types, and a description of the enterprise's own communication services that will be usable by other associated enterprises (e.g., voice, video, applications, etc.) The profile may also control options such as visibility to other enterprises, auto-accept of incoming requests to associate, etc. Examples of visibility options include: make profile visible to any enterprise; make profile invisible to all enterprises; make profile visible to a specific set of enterprises. The enterprise E1 105 also subscribes (535) to notifications of new confirmed associations (i.e., "friends"). This subscription may take place before joining the enterprise.

Service provider 120 acts as an intermediary between enterprises that wish to associate with each other. Service provider 120 receives (540) a request for an association, where the request includes identifying information about the requesting enterprise. Service provider 120 uses information provided earlier, when the requesting enterprise joined the federated system 100, to perform authentication and/or verification (545). The service provider 120 passes (550) the request for association on to the target enterprise E1 105 and the enterprise E1 105 accepts (555) the request. No identifying information is needed in the acceptance, since the requesting enterprise already has information about the target enterprise before making the request for association. Next, the service provider 120 forwards (560) the acceptance to the initiating enterprise. Although a request and explicit acceptance were described, other embodiments use an auto-confirm where the service provider 120 accepts on behalf of the target enterprise E1 105, without first contacting the target enterprise E1 105.

After the association is accepted, service provider 120 notifies (565) the target enterprise E1 105 of the new association. This notification includes additional information related to the initiating enterprise. In particular, the new association notification provides a new contact address. The enterprise E1 105 uses this new contact address to request (570) information about a direct routed path 210 to the initiating enterprise. In response to the request, service provider 120 returns (575) direct routed path information including a target trunk identifier, a target trunk type, trunk capacity (e.g., bandwidth, number of sessions), a list of services (e.g., voice, video, etc.) and a list of addresses. Addresses are specified in terms of a domain (which may include a wildcard) and a name/URI/phone number.

The enterprise E1 105 then routes calls to/from the associated enterprise over this direct routed path 210 to the associated enterprise. An analogous process is followed by the initiating enterprise to obtain information about the same direct routed path 210, and the initiating enterprise also routes calls to/from the associated enterprise over this direct routed path 210.

Figure 6:
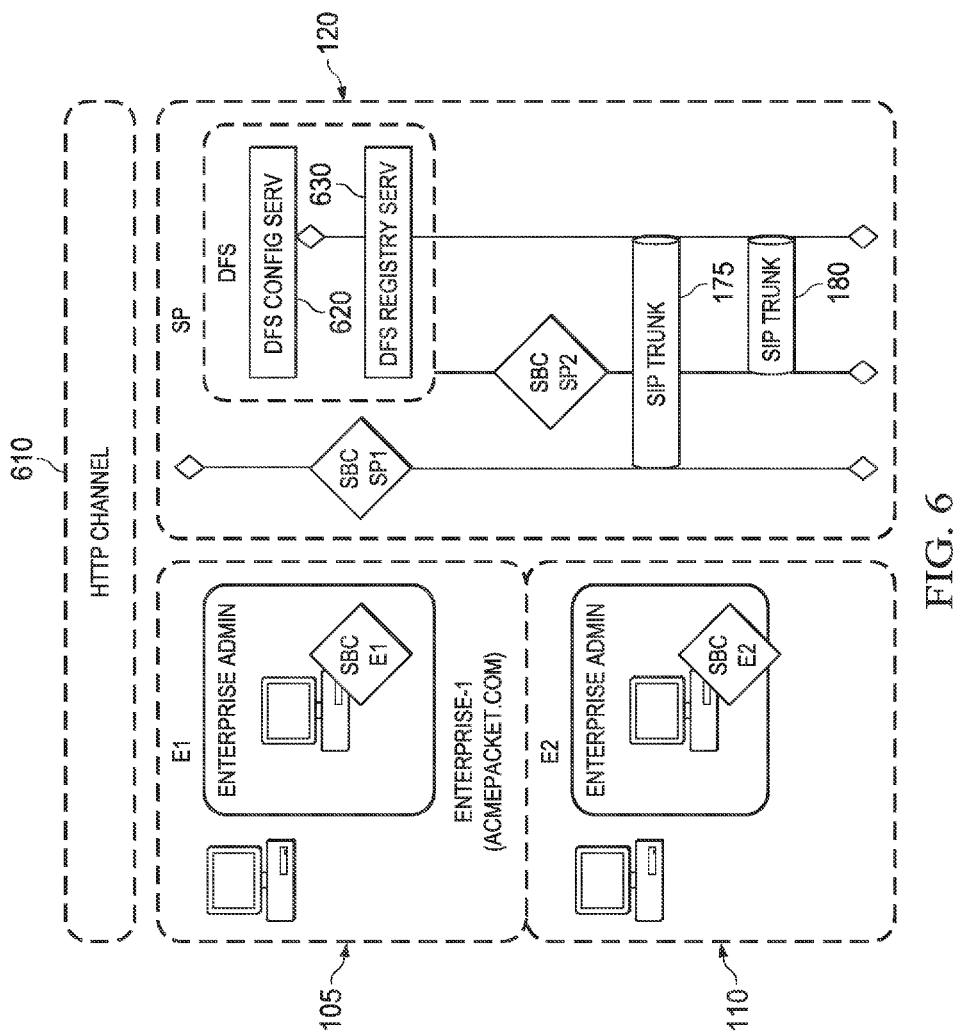
FIG. 6 is a block diagram illustrating the components and the channels of FIG. 5 according to some embodiments disclosed herein.

Having explained at a high level the operations which result in creation of a direct routed path 210 (FIG. 2) between two enterprise SBCs, the operations of FIG. 5 will now be described in more details in FIGS. 6-11. FIG. 6 is a block diagram illustrating the components and the channels of FIG. 5 in further detail, while FIGS. 7-11 are sequence diagrams describing, in even more detail, how the components communicate over these channels to perform the operations of FIG. 5.

As shown in FIG. 6, each enterprise (E1 105, E2 110) includes an administrative client 193 and an SBC (SBC-E1 135, SBC-E2 145). The service provider 120 includes a peer service provider SBC (SBC-SP1 150, SBC-SP2 155) for each enterprise SBC. Communication between administrative client 193 and dynamic federation system 185 takes place over the Internet 167 using a protocol other than SIP, i.e., the administrative channel is a non-SIP channel. In some embodiments, this administrative communication utilizes an HTTP channel 610. Communication between an enterprise SBC and its peer SBC at the service provider occurs over a SIP trunk (175, 180). The dynamic federation system 185 at service provider 120 includes a DFS configuration server 620 and a DFS registry server 630.

Figure 7:
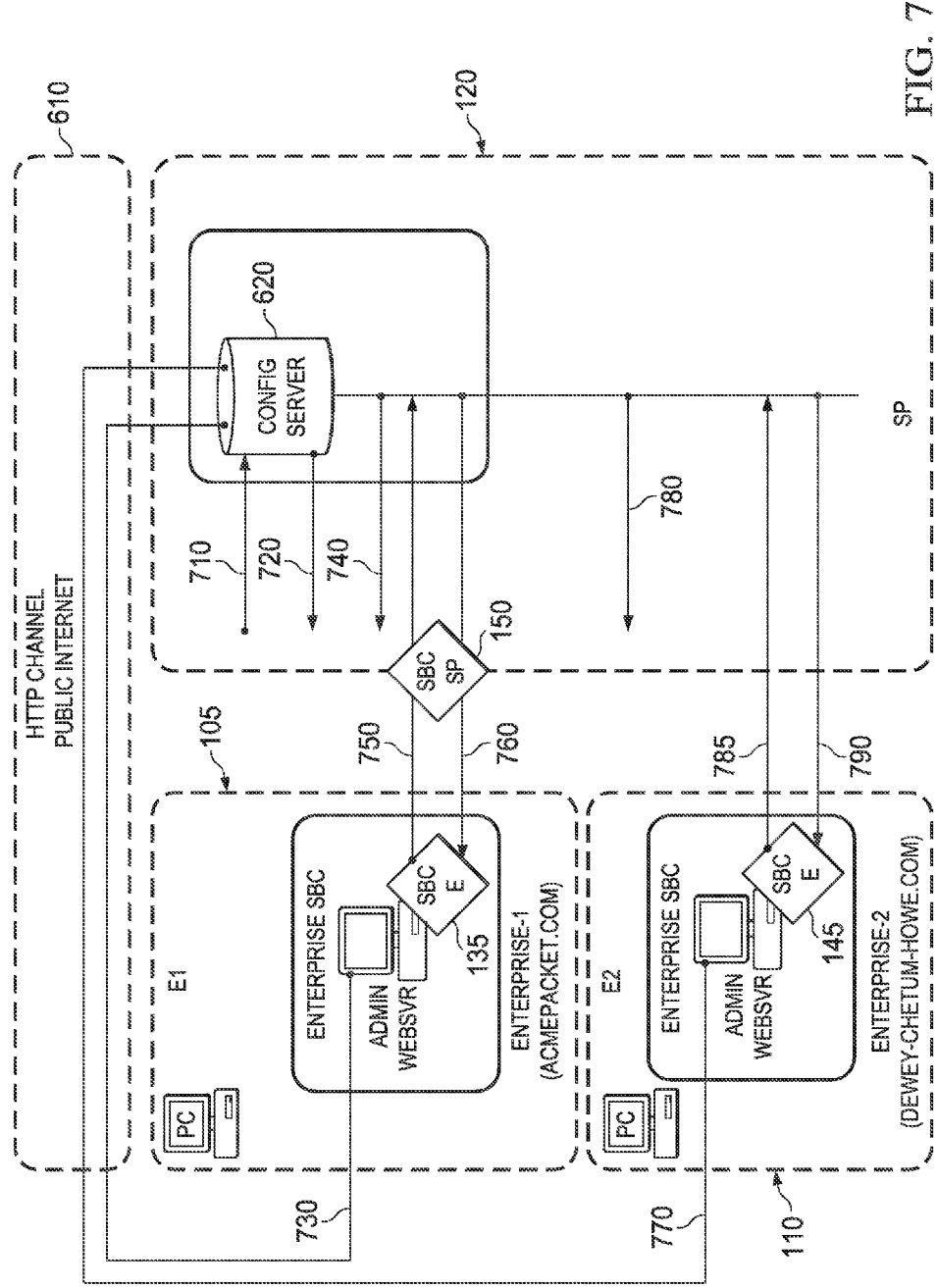
FIG. 7 is a sequence diagram describing how various components communicate to perform some of the operations of FIG. 5 according to some embodiments disclosed herein.

FIG. 7 is a sequence diagram describing, in further detail, configuration of the service provider SBC and the enterprise SBCs. In the example of FIG. 7, SIP and HTTP secure (HTTP-S) are the communication protocols used to set up the SIP trunks and the dynamic federation, and to perform automatic configuration. At step 710, the service provider SBC (e.g., SBC-SP1 150) sends a SIP Subscribe message to DFS configuration server 620 over HTTP channel 610, using a preconfigured URI. As should be appreciated, a SIP Subscribe message includes an event package which describes the notifications in which the subscriber is interested. The event package used in the SIP Subscribe message is an http-monitor event package, with a body parameter that specifies whether an HTTP body should be included in the subsequent notifications. As a result of the SIP Subscribe in step 710, SIP Notify messages will be sent for pertinent changes in SBC configuration, which includes changes to the service provider SBC as well as changes to enterprise SBCs.

At step 720, a SIP Notify message is sent from DFS configuration server 620 to the service provider SBC (SBC-SP1 150), indicating a change to the service provider SBC configuration. This "change" actually represents the initial SBC configuration. The SIP Notify message in step 720 contains a SIP content-type of message/http (i.e., message body contains HTTP headers only that returned from HTTP GET). The HTTP content-location header within the message body specifies the URL of the SBC configuration. The service provider SBC (SBC-SP1 150) performs an HTTP GET request to this URL, which retrieves the SBC configuration in the HTTP response body. The service provider SBC (SBC-SP1 150) then applies this retrieved configuration.

At step 730, an enterprise SBC (SBC-E1 135) sends a JoinEnterprise message to DFS configuration server 620 over the HTTP channel 610. Before the enterprise SBC can be configured, the service provider must be notified of the new enterprise SBC's configuration. Thus, at step 740 the DFS configuration server 620 sends another SIP Notify message to the service provider SBC. This second SIP Notify message includes information about the enterprise SBC configuration. At step 750, the enterprise SBC (SBC-E1 135) sends a SIP Subscribe message to subscribe to changes to its own configuration, and at step 760 the DFS configuration server 620 sends a SIP Notify back to the new enterprise SBC (SBC-E1 135), including the initial configuration for the enterprise SBC.

At step 770, another enterprise SBC (SBC-E2 145) joins federated system 100 by sending a JoinEnterprise message over HTTP channel 610. As before, the service provider is notified of the second enterprise SBC's configuration, through a SIP Notify message (step 780) from the DFS configuration server 620 to the service provider SBC. At step 785, the second enterprise SBC sends a SIP Subscribe message to subscribe to changes to its own configuration. At step 790, the DFS configuration server 620 sends a SIP Notify including the initial configuration for the second enterprise SBC.

Figure 8:
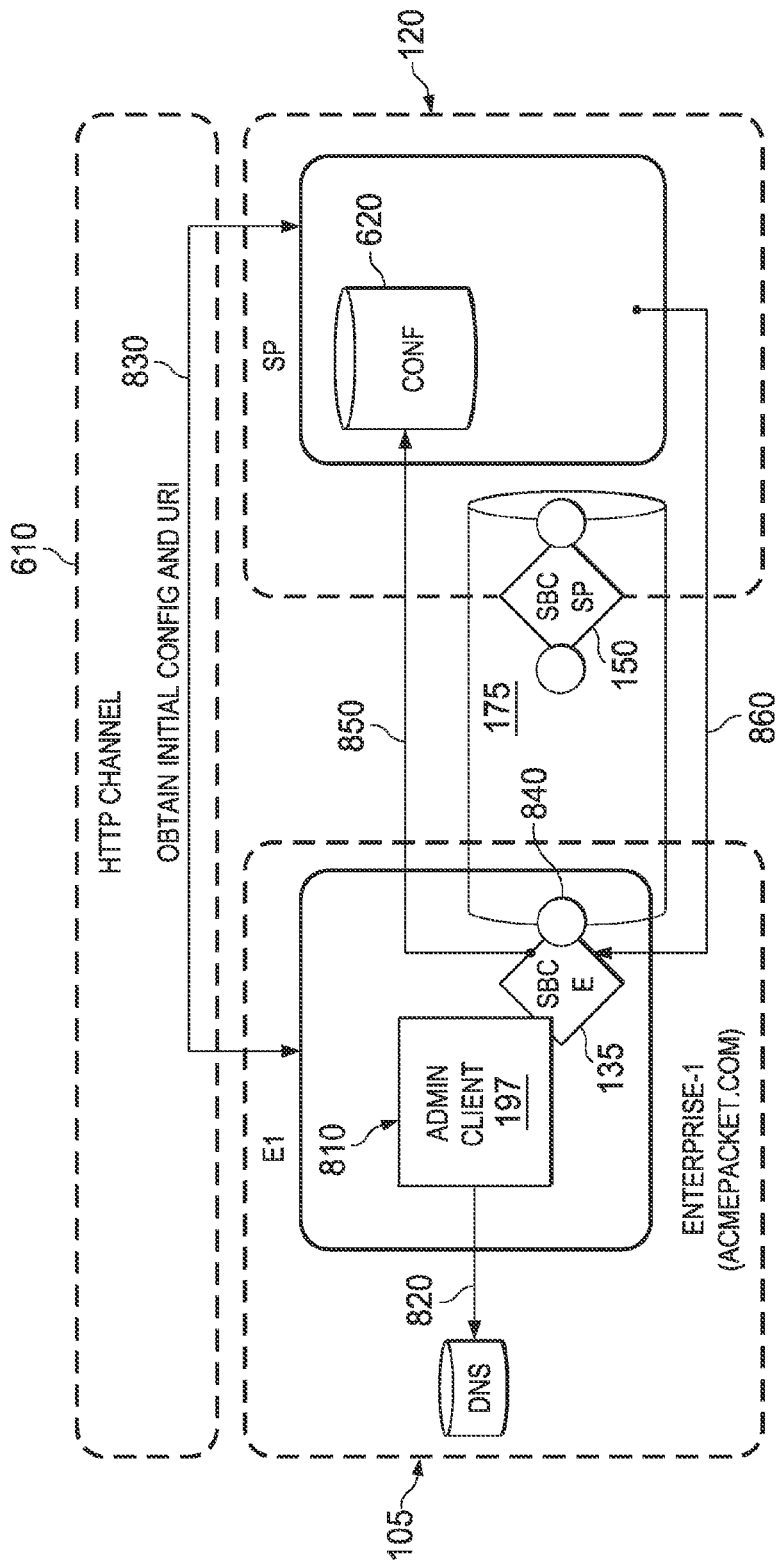
FIG. 8 is a sequence diagram describing how various components communicate to perform some of the operations of FIG. 5 according to some embodiments disclosed herein.

FIG. 7 illustrated the overall process of configuring the service provider and enterprise SBCs, with initial contact through the HTTP channel 610 and subsequent communication through SIP trunk 175. FIG. 8 is a sequence diagram describing, in further detail, some of the steps from FIG. 5, in particular, steps relating to configuration of an enterprise SBC and creation of the SIP trunk 175. At step 810, an enterprise administrator uses administrative client 193 to specify the Configuration Service Domain of the enterprise SBC (SBC-E1 135), using an predetermined service field value such as "SFUA.CFG". At step 2, administrative client 193 obtains the URL for an SBC configuration request by making a NAPTR request to the DNS server. At step 830, administrative client 193 communicates with DFS configuration server 620 over HTTP channel 610, using the URL obtained in step 820 with a secure HTTP (HTTPS) GET request. The GET request retrieves the SBC configuration in the HTTP response body. More specifically, the monitor link header the GET response contains the URI to be used in a SIP Subscribe, and also indicates the SIP subscription mechanism to be used.

At step 840, the enterprise SBC (SBC-E1 135) applies the configuration retrieved in step 830 and creates a SIP trunk 175 having a specific bandwidth between the enterprise SBC (SBC-E1 135) and its corresponding service provider SBC (SBC-SP1 150). This SIP trunk 175 is used not only to communicate between pipe endpoints (SBC-E1 135 and SBC-SP1 150), but also to communicate between the enterprise SBC (SBC-E1 135) and DFS configuration server 620, with the service provider SBC (SBC-SP1 150) acting as an intermediary. In particular, DFS configuration server 620 uses SIP trunk 175 to communicate an initial enterprise SBC configuration as well as changes to that configuration. A simplified version of the subscribe/notify process was initially described in FIG. 7 without reference to the SIP trunk 175. The remainder of the process in FIG. 8 will now be described with reference to the SIP trunk 175.

At step 850, the enterprise SBC (SBC-E1 135) sends a SIP Subscribe message to DFS configuration server 620 over SIP trunk 175, subscribing to changes to its own configuration. The name and URI of the service provider SBC (SBC-SP1 150) was obtained from the retrieved configuration and from the GET response in step 830. The event package used in the SIP Subscribe message is an http-monitor event package, with a body parameter specifying that the HTTP body should be included in the subsequent notifications.

At step 860, a SIP Notify message is sent from DFS configuration server 620 to enterprise SBC (SBC-E1 135) over SIP trunk 175. The SIP Notify message contains a SIP content-type of message/http (i.e. message body contains HTTP headers only that returned from HTTP GET), where the HTTP content-location header within the message-body-specified URL includes the initial configuration for the enterprise SBC.

Figure 9:
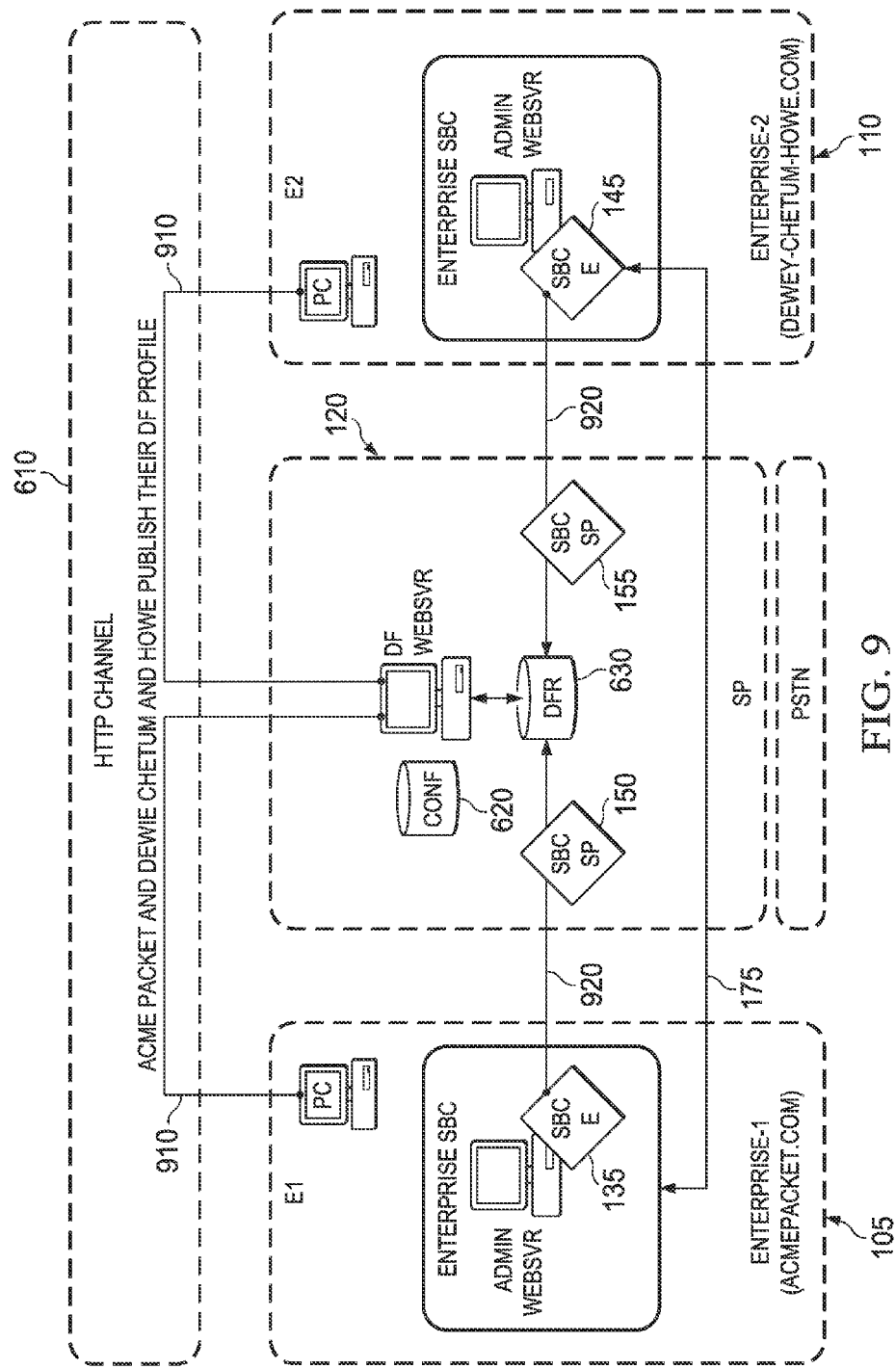
FIG. 9 is a sequence diagram describing how various components communicate to perform some of the operations of FIG. 5 according to some embodiments disclosed herein.

FIG. 9 is a sequence diagram describing the process used by enterprise SBCs (SBC-E1 135 and SBC-E2 145) to join an enterprise federation and to subscribe to new associations. This same process was described earlier in connection with FIG. 5, but further details of the channels used are presented herein FIG. 9. Step 910 represents two enterprises joining the federation, which includes providing a profile to be published. Although shown as one step, each enterprise joins separately, usually at different times. Step 920 shows the enterprise SBC (SBC-E1 135, SBC-E2 145) for each of the joined enterprise communicating with DFS registry server 630, over SIP trunk 175, to subscribe to new associations. Although shown as one step, each enterprise subscribes to new associations separately, usually at different times.

Figure 10:
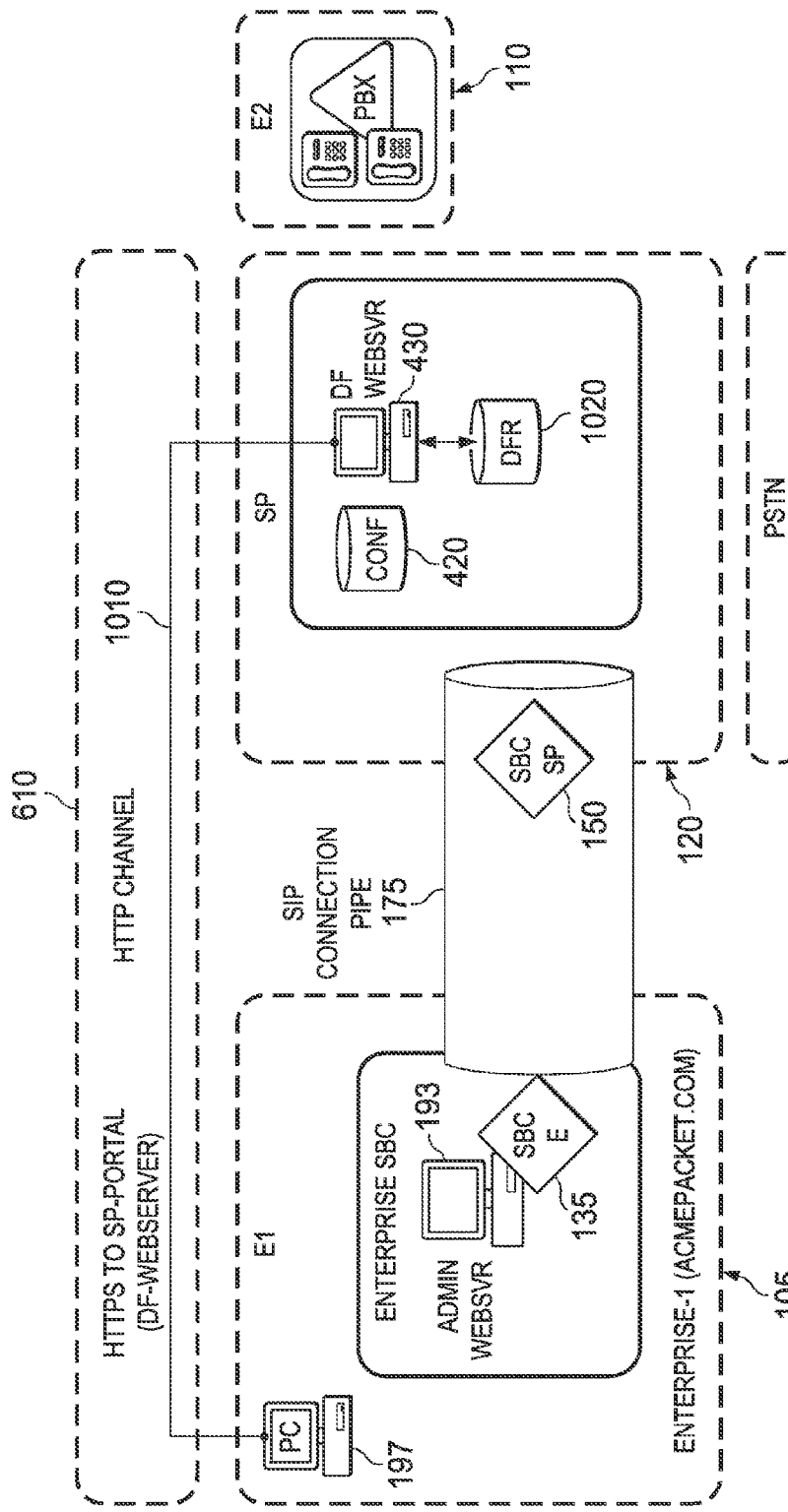
FIG. 10 is a sequence diagram describing how various components communicate to perform some of the operations of FIG. 5 according to some embodiments disclosed herein.

The enterprise join and subscribe to new associations processes of FIG. 9 will now be described in more detail in connection with the sequence diagrams of FIGS. 10 and 11, respectively. At step 1010, an enterprise user operating administrative client 193 causes the enterprise to join the federation by publishing an enterprise profile. The join/publish is accomplished by administrative client 193 accessing a web page stored on DFS registry server 630, where this access occurs over HTTP channel 610. In creating the profile, the user defines configuration options, such as whether requests to associate will be automatically accepted, whether or not the profile is visible to other enterprises, etc. The user also describes the enterprise, for example, reachable domain(s), reachable names/numbers, trunk types, and services (voice, video, apps, etc).

At step 1020, DFS registry server 630 responds to the web page edits by creating, or "publishing," a profile entry in the DFS registry. This publication makes the enterprise's trunk public, in accordance to defined visibility rules if applicable. The owner of the DFS registry (e.g. the service provider) may have policy controls over which enterprises are allowed to join the enterprise. The enterprise and/or the registry owner may control visibility of the enterprise profile. The shared information in the profile is includes Trunk Identifiers (TID) as well as trunk Types/Services/domains/addresses as provided by the enterprise user. The trunk bandwidth and/or sessions entered by the user are limited to negotiated levels.

Figure 11:
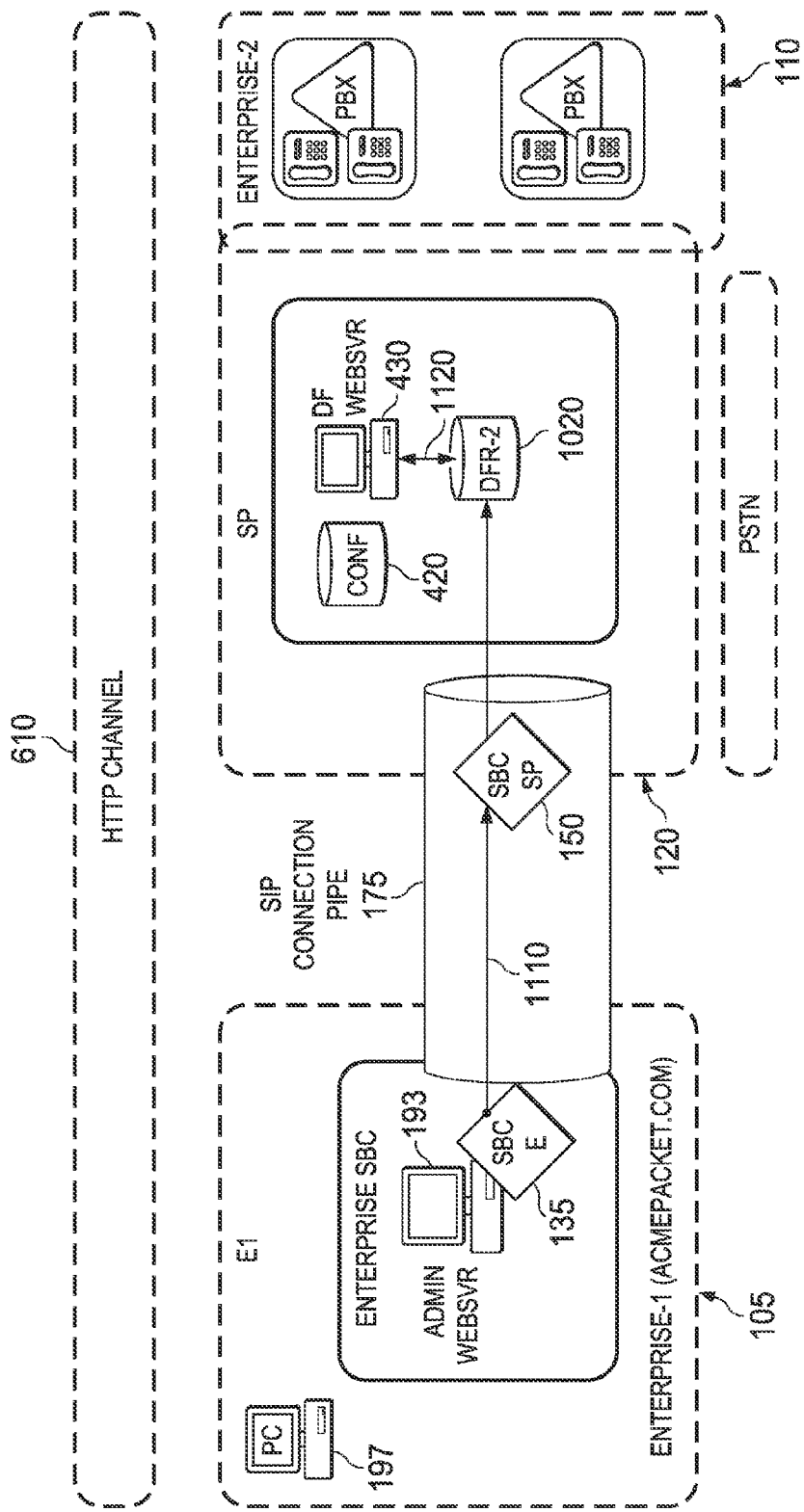
FIG. 11 is a sequence diagram describing how various components communicate to perform some of the operations of FIG. 5 according to some embodiments disclosed herein.

FIG. 11 is a sequence diagram describing, in further detail, the process of an enterprise subscribing to new associations. In some embodiments, this procedure is triggered immediately after the initial configuration of the enterprise SBC. At step 1110, the enterprise SBC (SBC-E1 135) sends a SIP Subscribe message to DFS registry server 630 over SIP trunk 175, subscribing to confirmed associations ("friends"). At step 1120, DFS registry server 630 updates the enterprise's entry in the DFS registry database to indicate that this subscription is active. If "active" associations for this enterprise are already present in the registry database, the "active" status will be reflected on subsequent queries to the registry database by the DFS web server.

Figure 12:
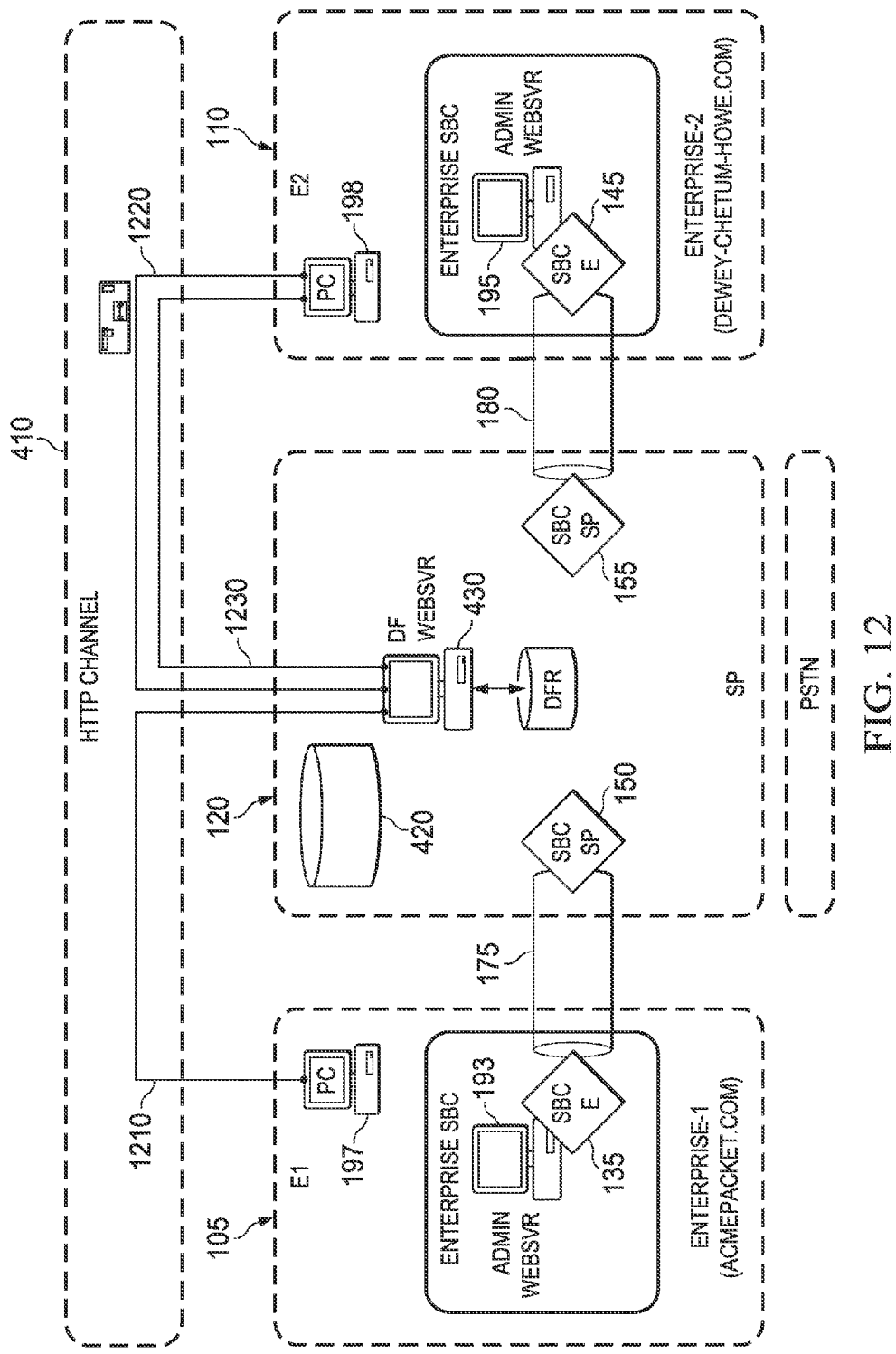
FIG. 12 is a sequence diagram describing how various components communicate to perform some of the operations of FIG. 5 according to some embodiments disclosed herein.

Once an enterprise has published its profile and enabled new associations, another enterprise can request an association (i.e., "friend" the first enterprise). FIG. 12 is a sequence diagram describing an overview of the association process. At step 1210, a user at enterprise E1 105 (the "initiating enterprise") operates administrative client 193 to initiate request for association (i.e., a "friend" request) to the DFS registry server 630 over HTTP channel 610. At step 1220, DFS registry server 630 forwards the request for association to enterprise E2 110 (the "target" enterprise) over HTTP channel 610. Instead of an HTTP transaction, DFS registry server 630 may use other mechanisms, such as email, SMS, etc. At step 1230, a user at enterprise E2 110 (via administrative client 198 and administrative server) interacts with the DFS registry server 630 to indicate that the request for association has been accepted. The DFS registry server 630 may keep track of "friend" requests for some period of time.

Figure 13A:
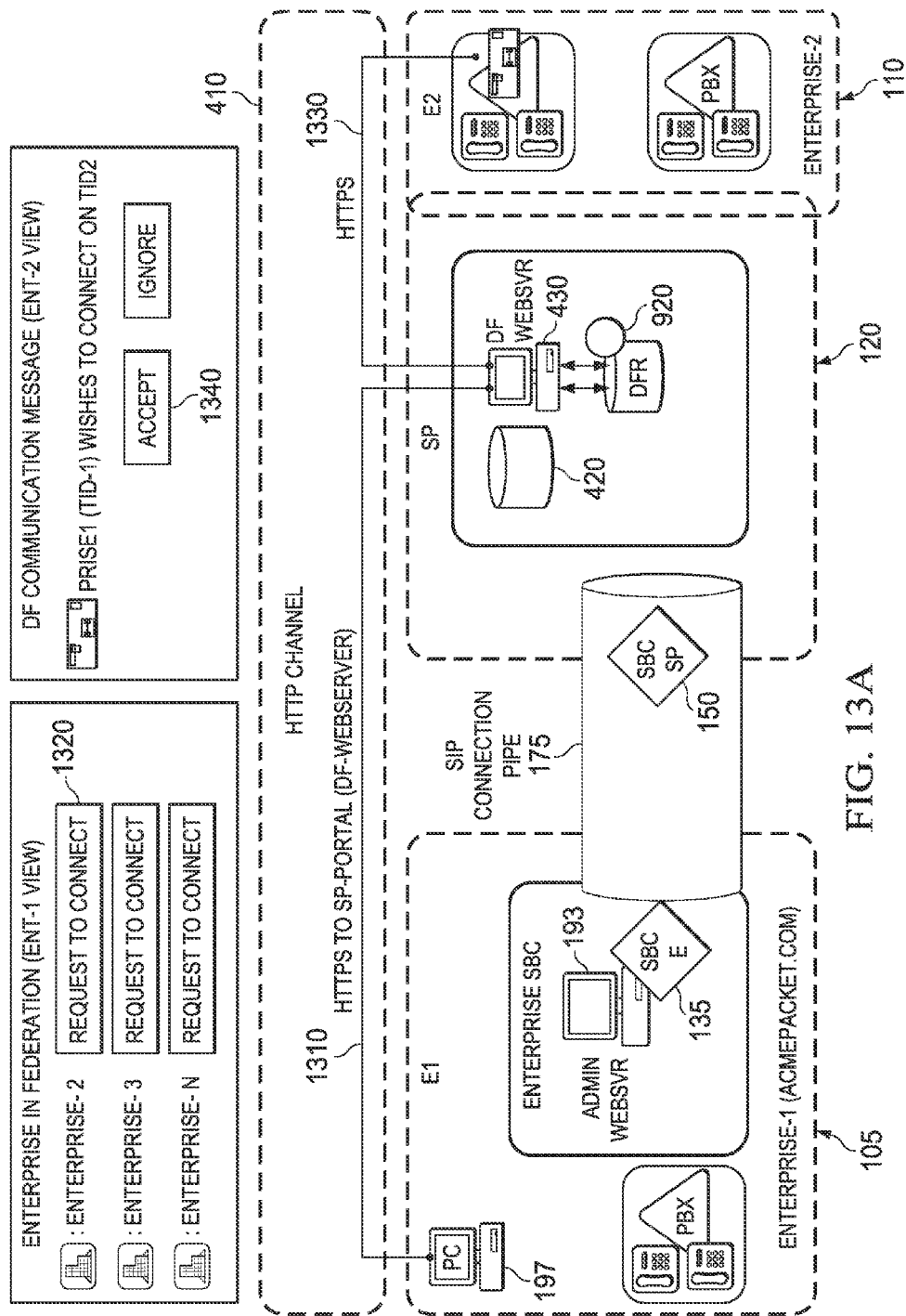
FIGS. 13A-C form a sequence diagram describing some of the operations of FIG. 12 in further detail according to some embodiments disclosed herein.
Figure 13B:
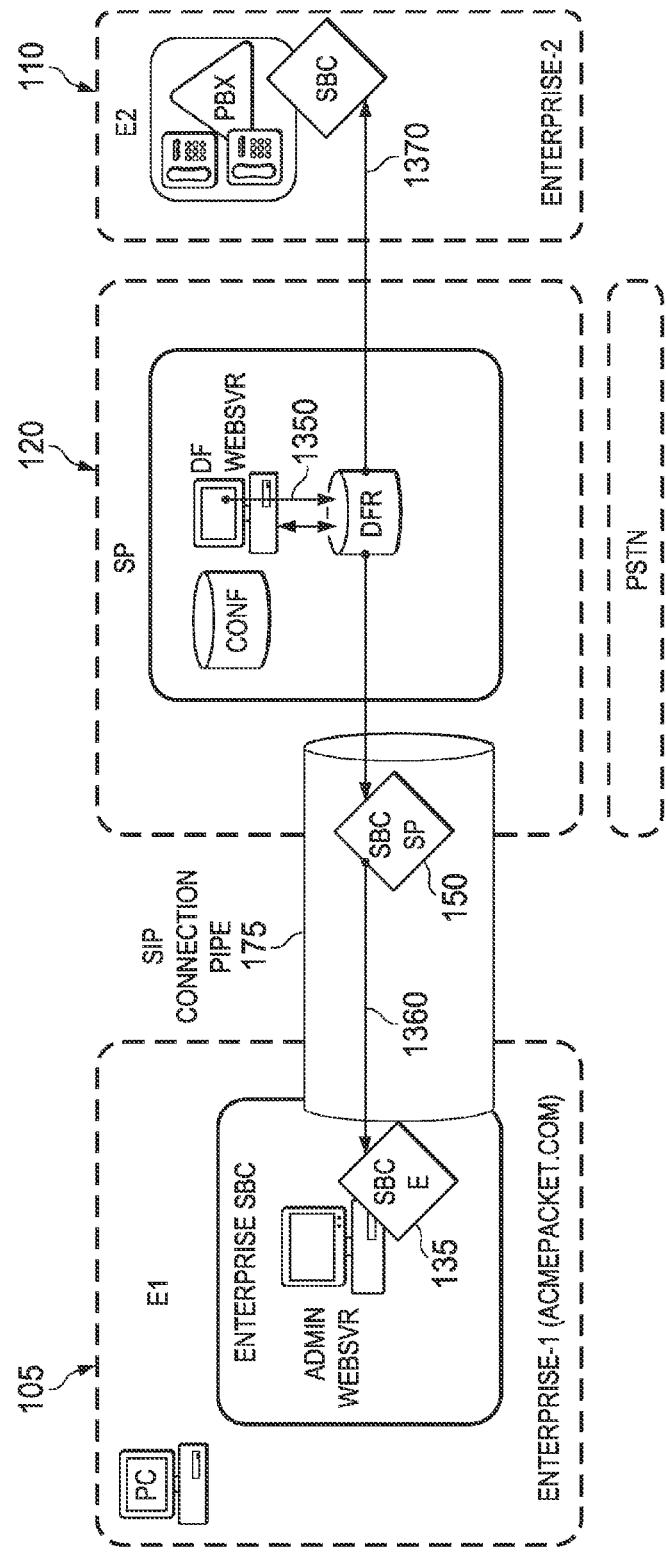
Figure 13C:
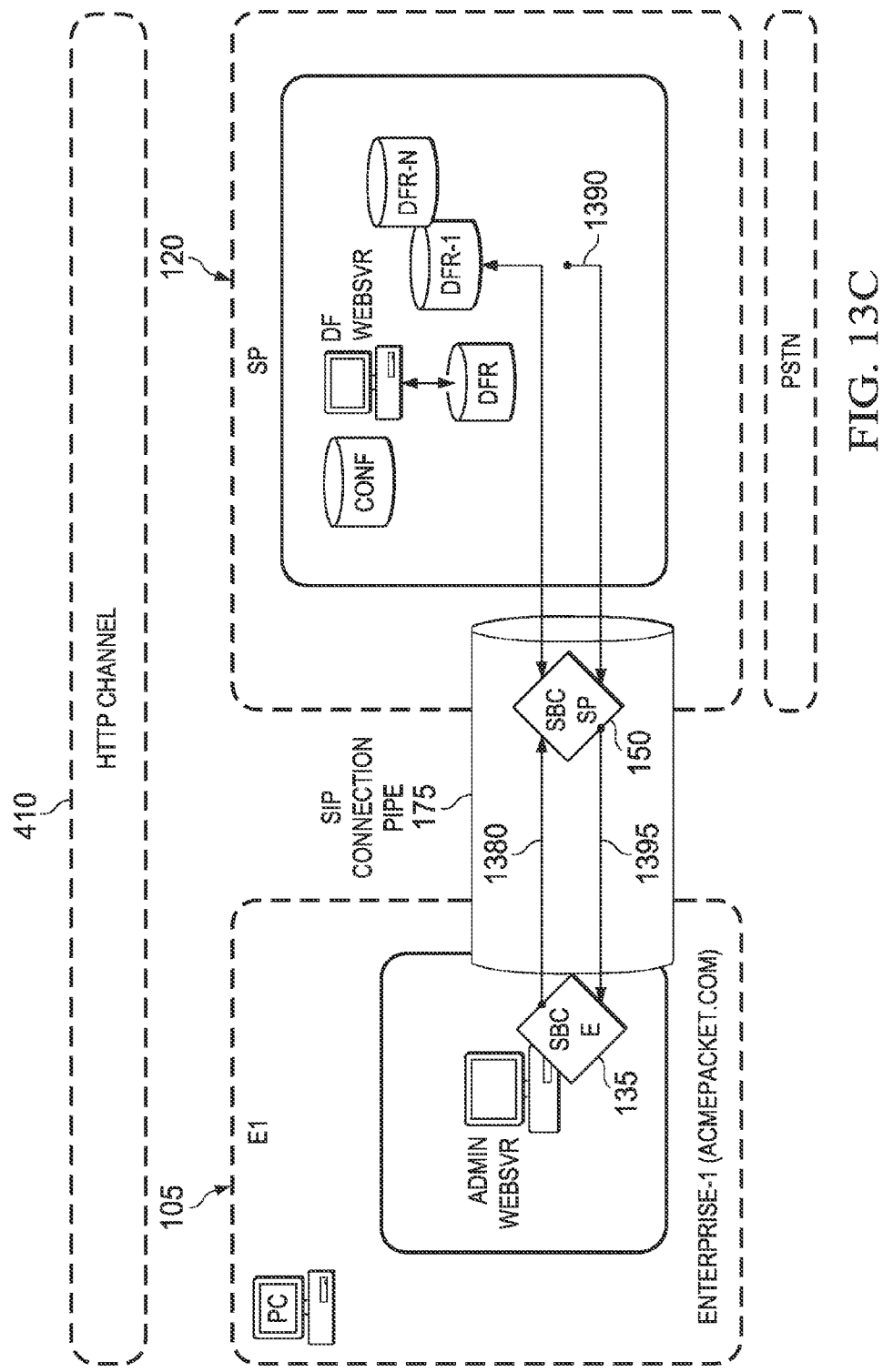

FIGS. 13A-C form a sequence diagram describing the association process in further detail. Starting with FIG. 13A, at step 1310 a user at the initiating enterprise (E1 105) accesses a web page stored on DFS registry server 630, where this access occurs over HTTP channel 610. In response, DFS registry server 630 queries the registry for a list of enterprises that are available for association. At step 1320, the user at initiating enterprise E1 105 selects from this list another enterprise with which to associate. At step 1330, DFS registry server 630 forwards the request for association to the target enterprise (E2 110) over HTTP channel 610. At step 1340, a user at target enterprise E2 110 logs in to DFS registry server 630, looks at the new "request for association" message and accepts the proposed association with the initiating enterprise. If the target enterprise profile indicates "auto accept", then steps 1330 and 1340 are skipped.

At this point, an enterprise-to-enterprise association has been requested, accepted, and confirmed. Moving on to FIG. 13B, at step 1350 DFS registry server 630 updates the registry with the newly created association between initiating enterprise E1 105 and target enterprise E2 110. At step 1360, DFS registry server 630 sends a SIP Notify message over SIP trunk 175 to initiating enterprise E1 105, notifying the enterprise of the new association. At step 1370, DFS registry server 630 also sends a SIP Notify message to target enterprise E2 110 over a corresponding SIP pipe (not shown). Each SIP Notify includes an identifier for the associated ("friended") enterprise and trunk. However, the trunk identifier is only visible to the service provider SBC which the endpoint of the SIP pipe. The service provider SBC then strips the trunk identifier. The route set in the SIP Notify includes a contact address and/or fully qualified domain name for DFS registry server 630, which the enterprise SBC will use to obtain information about a direct routed path to the associated enterprise SBC.

Moving on to FIG. 13C, at step 1380 the enterprise SBC (SBC-E1 135) sends another SIP Subscribe to the service provider SBC over its SIP trunk 175. In some embodiments, this second Subscribe has a limited lifespan and expires upon a corresponding SIP Notify. The Subscribe in step 1380 includes the contact address of the DFS registry server 630, obtained from the route set of the previous SIP Notify (step 1360 in FIG. 13B). Receipt of the SIP Subscribe with the contact address triggers the service provider SBC to send a SIP Notify to DFS registry server 630. At step 1390 DFS registry server 630 sends a SIP Notify to service provider SBC, where this second notify includes a data block with information about a direct routed path to the associated enterprise SBC. The service provider SBC (SBC-SP1 150) examines the SIP Notify received from DFS registry server 630 and strips headers off as appropriate. At step 1395 the service provider SBC (SBC-SP1 150) sends a SIP Notify including the same data block to the enterprise SBC over the SIP trunk 175. The SIP Notify sent at step 1395 allows the enterprise SBC (SBC-E1 135) to determine a directed routed path (210 in FIG. 2) to the associated SBC located in another enterprise (SBC-E2 145).

In some embodiments, explained in more detail below, an enterprise SBC learns the direct routed path 210 to the associated SBC by examining the various SIP Notify messages that it receives in the process of FIG. 13 and obtaining the routes traversed by these messages. By examining the traversed routes, the enterprise SBC can learn the associated SBC's target trunk identifier, a target trunk type, trunk capacity (e.g., bandwidth, number of sessions), a list of services (e.g., voice, video, etc.) and a list of addresses. Addresses are specified in terms of a domain (which may include a wildcard) and a name/URI/phone number. In other embodiments, the data block itself describes direct routed path 210 to the associated SBC, by including a target trunk identifier, a target trunk type, trunk capacity (e.g., bandwidth, number of sessions), a list of services (e.g., voice, video, etc.) and a list of addresses.

At the completion of step 1390, the target enterprise SBC (SBC-E1 135) now has information about the associated enterprise SBC (SBC-E2 145). Furthermore, since this process is symmetrical and repeated for both enterprise SBCs, the initiating enterprise SBC also learns about the target enterprise SBC. When a user of one enterprise makes a call to an associated enterprise, the originating enterprise SBC routes the call over the direct routed path to the associated enterprise as follows.

The enterprise SBC scans its route table for the longest match. If this scan identifies a matching number for a direct routed path, then that call is routed over that direct routed path. The specific Route-URI obtained is included in the SIP Offer and sent towards the service provider SBC. Some implementations may use a unique tag to help identify this as a direct routed path session. The service provider SBC receives the SIP Offer. If the tag is present, the service provider SBC may manipulate the Route-URI in order to hide topology information between the Enterprises for security reasons. The service provider SBC on the offering side of the call sends the SIP Offer directly to the service provider SBC that is associated with (connected to) the answerer associated enterprise. The service provider SBC for the answerer may strip specific information to hide topology. The service provider SBC for the answerer delivers the session to the enterprise SBC for the answer, over the specific Trunk-ID for that direct routed path. In this manner, specific SIP sessions—which have been approved and opted-in types of communication established over the dynamic federation—are identified, and these specific SIP sessions are routed in a direct manner so that the service provider's signaling infrastructure is avoided (offloaded). Avoiding the signaling infrastructure ensures that no signaling manipulation performed, where such manipulation may preventing the use of advanced IP telephony services.

Figure 14:
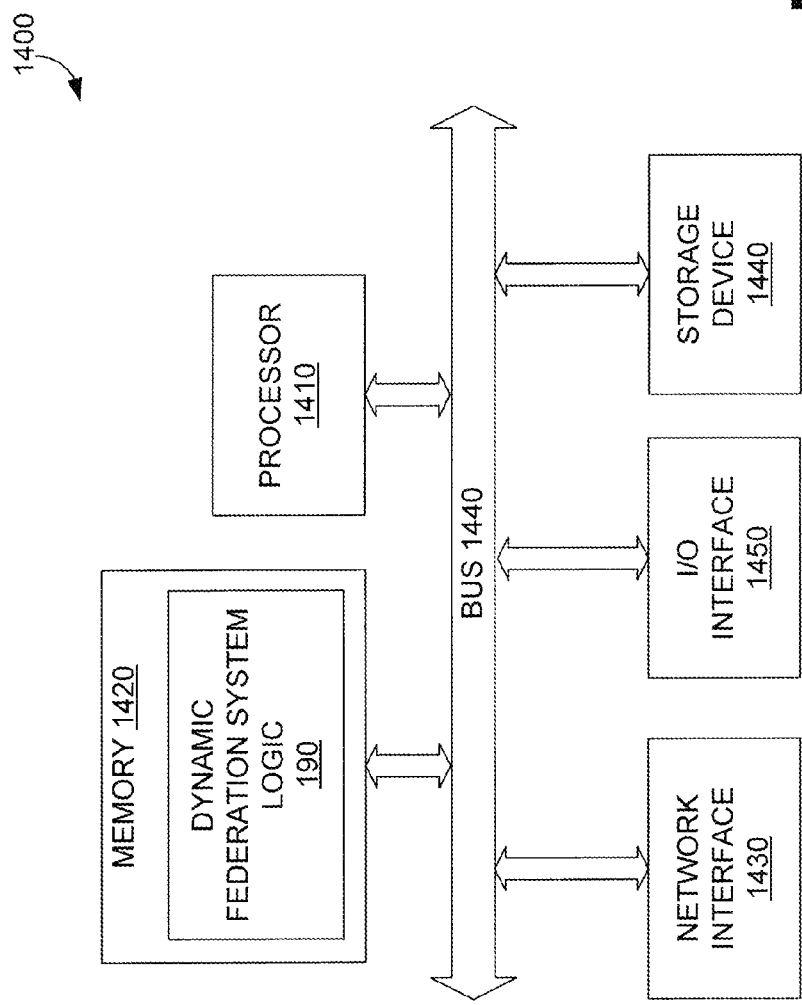
FIG. 14 is a block diagram of a network computing device that can be used to implement components of federated system of FIG. 1 according to some embodiments disclosed herein.

FIG. 14 is a block diagram of a network computing device that can be used to implement components of federated system 100, such as the various session border controllers and servers disclosed herein. Device 1400 includes a processor 1410, memory 1420, a network interface 1430, a storage device 1440 (e.g., non-volatile memory or a disk drive), and one or more input output (I/O) interfaces 1450. These hardware components are coupled via a bus 1460. Omitted from FIG. 14 are a number of components that are unnecessary to explain the operation of the federated system components.

The components of federated system 100 that are described herein can be implemented in software (i.e., instructions executing on a processor). FIG. 14 depicts a software implementation, with memory 1420 storing dynamic federation system logic 185. One or more components of dynamic federation system 185 can also be implemented in specialized hardware logic. Hardware implementations include (but are not limited to) a programmable logic device (PLD), programmable gate array (PGA), field programmable gate array (FPGA), an application-specific integrated circuit (ASIC), a system on chip (SoC), and a system in package (SiP). Persons of ordinary skill should also appreciate that these components may be implemented using any combination of hardware and software.

In some embodiments of federated system 100, the software-implemented dynamic federation system logic 185 is stored on a computer-readable medium, which in the context of this disclosure refers to any structure which can contain, store, or embody instructions executable by a processor. The computer readable medium can be based on electronic, magnetic, optical, electromagnetic, infrared, or semiconductor technology. Specific examples of a computer-readable medium using electronic technology include (but are not limited to) the following: a random access memory (RAM); a read-only memory (ROM); and an erasable programmable read-only memory (EPROM or Flash memory). Specific examples using magnetic technology include (but is not limited to) a disk drive; and a portable computer diskette. Specific examples using optical technology include (but are not limited to) a compact disk read-only memory (CD-ROM) or a digital video disk read-only memory (DVD-ROM).

Any process descriptions or blocks in flowcharts would be understood as representing modules, segments, or portions of code which include one or more executable instructions for implementing specific functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

At least the following is claimed:

1. A method, performed in a session border controller, of establishing Internet Protocol (IP) telephony sessions between enterprises, the method comprising:
    learning a route path for reaching a first enterprise from a second enterprise, the first enterprise and the second enterprise both belonging to a federation and obtaining IP telephony services from the same service provider, wherein the service provider comprises a Public Switched Telephone Network (PSTN) gateway that provides telephone calls from the first enterprise to a PSTN;
    identifying an IP telephony session as a federated communication, wherein the IP telephony session is between a first communication device of the first enterprise and a second communication device of the second enterprise; and
    tagging the identified IP telephony session so that the identified IP telephony session traverses the learned route path, wherein the tagging indicates a federated communication and wherein the learned route path bypasses the PSTN gateway;
    wherein learning the route path comprises receiving at the session border controller located at the service provider a watcher event comprising a list of associated enterprises and session initiation protocol (SIP) headers comprising a route traversed by the watcher event, and parsing the SIP headers to determine the route path from the second enterprise to the first enterprise;
    wherein the first enterprise is coupled to the service provider via a first pair of session border controllers and a first SIP trunk, and the second enterprise is coupled to the service provider via a second pair of session border controllers and a second SIP trunk.

2. The method of claim 1, further comprising:
    conveying signaling packets of the IP telephony session over the learned route path.

3. The method of claim 1, further comprising:
    conveying media packets of the IP telephony session over the learned route path.

4. The method of claim 1, wherein the learned route path does not include TDM equipment.

5. The method of claim 1, wherein the learned route path does not include components that normalize traffic associated with telephony services provided by the IP telephony service provider.

6. The method of claim 1, wherein the learned route path is confined to a particular set of Session Border Controllers operated by the same IP telephony service provider.

7. The method of claim 1, wherein the learned route path is confined to traversal of a pair of enterprise Session Border Controllers and a pair of service provider Session Border Controllers, each of the pairs operated by the same IP telephony service provider.

8. A non-transitory computer-readable medium having instructions stored thereon that, when executed by a processor, cause the processor to establish Internet Protocol (IP) telephony sessions between enterprises, the establishing comprising:
    learning a route path for reaching a first enterprise from a second enterprise, the first enterprise and the second enterprise both belonging to a federation and obtaining IP telephony services from the same service provider, wherein the service provider comprises a Public Switched Telephone Network (PSTN) gateway that provides telephone calls from the first enterprise to a PSTN;
    identifying an IP telephony session as a federated communication, wherein the IP telephony session is between a first communication device of the first enterprise and a second communication device of the second enterprise; and
    tagging the identified IP telephony session so that the identified IP telephony session traverses the learned route path, wherein the tagging indicates a federated communication and wherein the learned route path bypasses the PSTN gateway;
    wherein learning the route path comprises receiving at a session border controller located at the service provider a watcher event comprising a list of associated enterprises and session initiation protocol (SIP) headers comprising a route traversed by the watcher event, and parsing the SIP headers to determine the route path from the second enterprise to the first enterprise;
    wherein the first enterprise is coupled to the service provider via a first pair of session border controllers and a first SIP trunk, and the second enterprise is coupled to the service provider via a second pair of session border controllers and a second SIP trunk.

9. The computer-readable medium of claim 8, the establishing further comprising:
    conveying signaling packets of the IP telephony session over the learned route path.

10. The computer-readable medium of claim 8, the establishing further comprising:
    conveying media packets of the IP telephony session over the learned route path.

11. A system for establishing Internet Protocol (IP) telephony sessions between enterprises, the system comprising:
a processor coupled to a storage device, the processor executing functionality comprising:
learning a route path for reaching a first enterprise from a second enterprise, the first enterprise and the second enterprise both belonging to a federation and obtaining IP telephony services from the same service provider, wherein the service provider comprises a Public Switched Telephone Network (PSTN) gateway that provides telephone calls from the first enterprise to a PSTN;
identifying an IP telephony session as a federated communication, wherein the IP telephony session is between a first communication device of the first enterprise and a second communication device of the second enterprise; and
tagging the identified IP telephony session so that the identified IP telephony session traverses the learned route path, wherein the tagging indicates a federated communication and wherein the learned route path bypasses the PSTN gateway;
wherein learning the route path comprises receiving at a session border controller located at the service provider a watcher event comprising a list of associated enterprises and session initiation protocol (SIP) headers comprising a route traversed by the watcher event, and parsing the SIP headers to determine the route path from the second enterprise to the first enterprise;
wherein the first enterprise is coupled to the service provider via a first pair of session border controllers and a first SIP trunk, and the second enterprise is coupled to the service provider via a second pair of session border controllers and a second SIP trunk.

12. The system of claim 11, further comprising:
conveying signaling packets of the IP telephony session over the learned route path.

13. The system of claim 11, the establishing further comprising:
conveying media packets of the IP telephony session over the learned route path.

* * * * *